(12) United States Patent
Xue et al.

(10) Patent No.: US 12,368,557 B2
(45) Date of Patent: Jul. 22, 2025

(54) COMMUNICATIONS METHOD, APPARATUS, AND SYSTEM

(71) Applicant: Huawei Technologies Co., Ltd., Shenzhen (CN)

(72) Inventors: Yifan Xue, Beijing (CN); Yiru Kuang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 335 days.

(21) Appl. No.: 17/794,811

(22) PCT Filed: Jan. 19, 2021

(86) PCT No.: PCT/CN2021/072608
§ 371 (c)(1),
(2) Date: Jul. 22, 2022

(87) PCT Pub. No.: WO2021/147836
PCT Pub. Date: Jul. 29, 2021

(65) Prior Publication Data
US 2023/0066040 A1 Mar. 2, 2023

(30) Foreign Application Priority Data
Jan. 23, 2020 (CN) .................. 202010077005.X

(51) Int. Cl.
*H04L 5/00* (2006.01)
*H04W 52/52* (2009.01)
*H04W 68/02* (2009.01)

(52) U.S. Cl.
CPC ........... *H04L 5/0051* (2013.01); *H04W 52/52* (2013.01); *H04W 68/02* (2013.01)

(58) Field of Classification Search
CPC ..... H04L 5/0051; H04L 5/0092; H04L 5/005; H04L 5/0007; H04L 5/0048; H04W 52/52;
(Continued)

(56) References Cited

U.S. PATENT DOCUMENTS

2012/0213108 A1  8/2012  Ji et al.
2014/0233530 A1  8/2014  Damnjanovic et al.
(Continued)

FOREIGN PATENT DOCUMENTS

CN  106211246 A1  12/2016
CN  108141299 A   6/2018
(Continued)

OTHER PUBLICATIONS

3GPP TS 38.300 V15.8.0, Dec. 2019, "3rd Generation Partnership Project; Technical Specification Group Radio Access Network; NR; NR and NG-RAN Overall Description; Stage 2 (Release 15)," 99 pages.
(Continued)

*Primary Examiner* — Jianye Wu
(74) *Attorney, Agent, or Firm* — Conley Rose, P.C.

(57) ABSTRACT

A communications method includes: when a terminal device is in a non-connected state, a system information block is received from a network device, where the system information block includes first information; and configuration of a reference signal used for operations such as automatic gain control (AGC) adjustment and time and frequency synchronization can be known based on the first information. In this way, the terminal device can wake up at a location of a first reference signal to prevent terminal device from waking up too early at a location of a synchronization signal block and to effectively reduce power consumption of the terminal device.

17 Claims, 9 Drawing Sheets

(58) Field of Classification Search
CPC ......... H04W 52/0229; H04W 52/0254; H04W 52/0258; H04W 52/028; H04W 52/0225; H04W 68/02; H04W 68/00; H04W 76/27; H04W 76/28
See application file for complete search history.

(56) References Cited

U.S. PATENT DOCUMENTS

| | | |
|---|---|---|
| 2016/0302175 A1 | 10/2016 | Blankenship et al. |
| 2018/0323830 A1 | 11/2018 | Park et al. |
| 2019/0104503 A1* | 4/2019 | Niu ..................... H04L 25/0202 |
| 2019/0223123 A1* | 7/2019 | Tang ................... H04W 56/001 |
| 2021/0105808 A1* | 4/2021 | Lei ........................ H04L 5/0051 |
| 2022/0174703 A1* | 6/2022 | Chai ................. H04W 72/1268 |
| 2022/0346070 A1 | 10/2022 | Kim et al. |

FOREIGN PATENT DOCUMENTS

| | | | |
|---|---|---|---|
| CN | 109691210 A | 4/2019 | |
| CN | 109842917 A | 6/2019 | |
| WO | 2017078464 A1 | 5/2017 | |
| WO | WO-2019095895 A1 * | 5/2019 | ............ H04W 24/02 |

OTHER PUBLICATIONS

ZTE et al., "Reference signal for RRC idle and inactive UEs", 3GPP TSG RAN WG1 #103-e , e-Meeting, Oct. 26-Nov. 13, 2020, R1-2007972, 6 pages.

* cited by examiner

COMMUNICATIONS METHOD, APPARATUS, AND SYSTEM

CROSS-REFERENCE TO RELATED APPLICATIONS

This is a U.S. National Stage of International Patent Application No. PCT/CN2021/072608 filed on Jan. 19, 2021, which claims priority to Chinese Patent Application No. 202010077005.X filed on Jan. 23, 2020. Both of the aforementioned applications are hereby incorporated by reference in their entireties.

TECHNICAL FIELD

Embodiments of this application relate to the field of communications technologies, and in particular, to a communications method, apparatus, and system.

BACKGROUND

In a 5G communications system, a reference signal (reference signal, RS) may be used for a plurality of purposes. For purposes of reducing network resource overheads and avoiding introduction of excessive cell-level reference signals, a finally determined cell-level reference signal is sent in a synchronization signal block (synchronization signal block. SSB). The SSB is periodically sent, and is sent in some slots (a slot in NR is a basic scheduling unit, and a length of the slot is related to a subcarrier spacing). For example, when the subcarrier spacing is 15 kHz, a length of one slot is 1 ms. In this case, a possible configuration is shown in FIG. 1. Four SSBs are sent within 2 ms, but four SSBs in a next periodicity are sent only after 20 ms.

If UE (User Equipment, user equipment) is in an inactive state or an idle state, the UE receives, on a paging occasion (paging occasion, PO), paging (paging) sent by a network side. The UE needs to receive paging downlink control information (downlink control information, DCI) before receiving the paging. In addition, before receiving the paging DCI, the UE needs to perform operations such as AGC adjustment and time and frequency synchronization in advance, to ensure that receiving performance of the paging DCI is high enough. As described above, a reference signal needs to be used for these operations.

Because an SSB periodicity may be long, in an extreme case, the UE may need to wake up a long time (for example, 20 ms) in advance, as shown in FIG. 2. In this case, a sleep time period of the UE is shortened. This causes a waste of power consumption of the UE.

SUMMARY

Embodiments of this application provide a communications method, apparatus, and system, to avoid a case that for a purpose of receiving a first reference signal, a terminal device wakes up from a dormant state early when the terminal device is in a non-connected state, so as to reduce power consumption of the terminal device.

To achieve the foregoing objectives, the following technical solutions are used in embodiments of this application.

According to a first aspect, an embodiment of this application provides a communications method, and the communications method is applied to a first wireless communications apparatus. When the first wireless communications apparatus is in a non-connected state, the first wireless communications apparatus receives a system information block, where the system information block includes first information, the first information includes configuration information of a first reference signal, and the first reference signal is a reference signal that can be used when the first wireless communications apparatus is in the non-connected state; and receives the first reference signal from a network device based on the first information.

When the first wireless communications apparatus is in the non-connected state, the first wireless communications apparatus may determine a sending time point of the first reference signal based on the configuration information of the first reference signal. The first reference signal is closer to a PO. In this case, the first wireless communications apparatus wakes up at a location of the first reference signal, and receives the first reference signal (which is used to better receive paging) based on the first information. This can prevent the first wireless communications apparatus from waking up too early at a location of an SSB, so that power consumption of the first wireless communications apparatus is reduced.

For example, the first information is included in at least one of a system information block 2 (system information block 2. SIB 2 for short) to a system information block y (system information block y, SIB y for short), and y≥3. Available/free space of the SIB 2 to the SIB y is large, and can accommodate the configuration information of the first reference signal. In addition, the first information does not change frequently. Therefore, excessively frequent sending of the first information can be avoided by putting the first information in the SIB 2 to the SIB y. This avoids increasing of signaling overheads.

With reference to the first aspect or the foregoing possible implementations, in another possible implementation, after receiving the system information block, the first wireless communications apparatus further receives second information from the network device, where the second information indicates a status of the first reference signal. Usually, the configuration information of the first reference signal does not change frequently, and the validity status of the first reference signal changes frequently. The validity status of the first reference signal is indicated by the second information, so that corresponding other types of SIBs do not need to be frequently sent for updating the "validity status of the first reference signal". This can reduce signaling overheads.

According to a second aspect, an embodiment of this application provides a communications method, which is applied to a communications apparatus. The method includes: when a first wireless communications apparatus is in a non-connected state, sending a system information block to the first wireless communications apparatus, where the system information block includes first information, the first information includes configuration information of a first reference signal, and the first reference signal is a reference signal that can be used when the first wireless communications apparatus is in the non-connected state; and sending the first reference signal to the first wireless communications apparatus based on the configuration information.

According to a third aspect, an embodiment of this application provides a communications method. The method includes: when a second wireless communications apparatus is in a connected state, a network device sends third information, and the second wireless communications apparatus receives the third information, where the third information includes configuration information of a second reference signal, and the second reference signal is a reference signal that can be used when the second wireless communications apparatus is in the connected state. When a first wireless communications apparatus is in a non-connected state, the network device sends a system information block, and the first wireless communications apparatus receives the system information block, where the system information block includes first information, the first information includes configuration information of a first reference signal, and the first reference signal is a reference signal that can be used when the first wireless communications apparatus is in the non-connected state. The second reference signal is a subset of the first reference signal. The first wireless communications apparatus parses the first information to obtain a receiving parameter. When the first wireless communications apparatus is in the non-connected state, the network device sends second information, and the first wireless communications apparatus receives the second information, where the second information indicates a status of the first reference signal. The first wireless communications apparatus determines that the status of the first reference signal indicated by the second information meets a condition, and receives the first reference signal from the network device based on the receiving parameter, where the first reference signal is located before a paging occasion (paging occasion, PO). The first wireless communications apparatus determines that the status of the first reference signal indicated by the second information does not meet the condition, and receives a synchronization signal block (synchronization signal block, SSB for short). The first wireless communications apparatus performs at least one of AGC adjustment, time synchronization, and frequency synchronization by using the first reference signal or the SSB. When the first wireless communications apparatus is in the non-connected state, the network device sends paging, and the first wireless communications apparatus receives the paging on the PO.

According to a fourth aspect, an embodiment of this application provides a wireless communications apparatus. The apparatus includes a receiving module, configured to: when the wireless communications apparatus is in a non-connected state, receive a system information block where the system information block includes first information, the first information includes configuration information of a first reference signal, and the first reference signal is a reference signal that can be used when the wireless communications apparatus is in the non-connected state; and receive the first reference signal from a network device based on the first information.

According to a fifth aspect, an embodiment of this application provides a communications apparatus. The apparatus includes a sending module, configured to: when a first wireless communications apparatus is in a non-connected state, send a system information block to the first wireless communications apparatus, where the system information block includes first information, the first information includes configuration information of a first reference signal, and the first reference signal is a reference signal that can be used when the first wireless communications apparatus is in the non-connected state; and send the first reference signal to the first wireless communications apparatus based on the configuration information.

According to a sixth aspect, an embodiment of this application provides a communications system. The system includes a terminal device configured to implement the method in the first aspect and a network device configured to implement the method in the second aspect.

According to a seventh aspect, an embodiment of this application provides a communications apparatus, including a memory and a processor. The memory is coupled to the processor. The memory is configured to store program instructions. The processor is configured to invoke the program instructions in the memory to perform the communications method according to the method in the first aspect or the communications method according to the method in the second aspect.

According to an eighth aspect, an embodiment of this application provides a readable storage medium. The readable storage medium stores a computer program. When the computer program is executed, the communications method according to the method in the first aspect or the communications method according to the method in the second aspect is implemented.

For beneficial effects that can be achieved by the communications method, the wireless communications apparatus, the communications apparatus, the communications system, and the readable storage medium in the second aspect to the eighth aspect, refer to the beneficial effects in the communications method in the first aspect provided above. Details are not described herein again.

DESCRIPTION OF EMBODIMENTS

Figure 3:
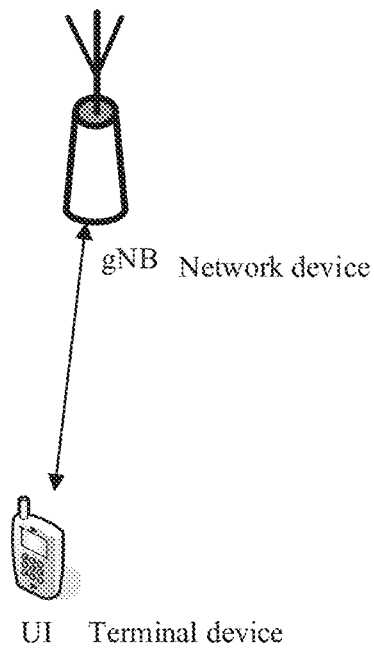
FIG. 3 is a schematic diagram of a communications system according to an embodiment of this application.

FIG. 3 is a schematic diagram of a communications system according to an embodiment of this application. As shown in FIG. 3, the communications system includes a network device and a terminal device.

In the following, some terms in this application are described, to help a person skilled in the art have a better understanding.

Figure 4:
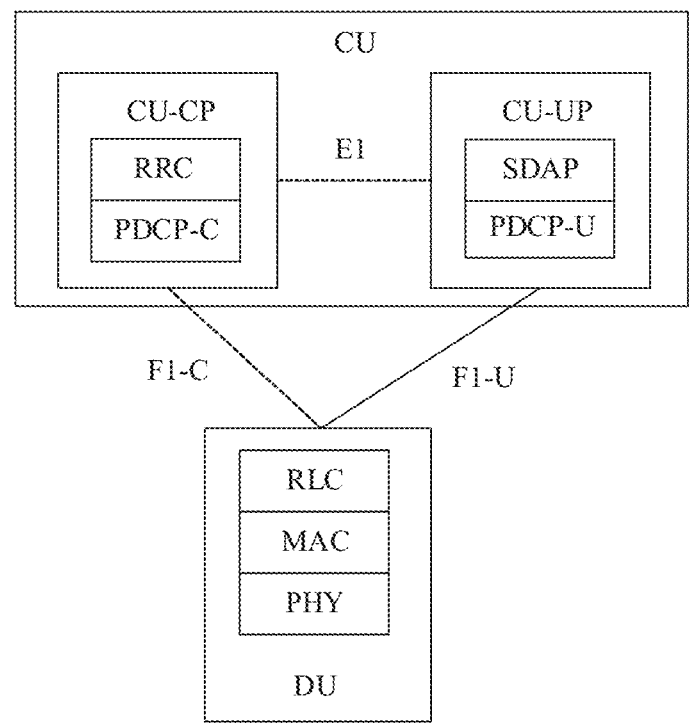
FIG. 4 is a schematic diagram of a protocol stack of a network device according to an embodiment of this application.

Network device: The network device is also referred to as a radio access network (Radio Access Network, RAN) device, is a device that connects a terminal device to a wireless network, and may be an evolved NodeB (Evolved NodeB, eNB or eNodeB) in long term evolution (Long Term Evolution, LTE), a relay station or an access point, or a base station in a 5G network, such as a transmission and reception point (Transmission and Reception Point, TRP), or a controller. This is not limited herein. In a possible implementation, an access network device may be a base station (for example, a gNB) in a CU-DU split architecture. FIG. 4 is a schematic diagram of a protocol stack of a network device according to an embodiment of this application. The RAN device may be connected to a core network device (for example, a core network in LTE or a core network in 5G). It may be understood that the base station is divided into a CU and a DU from a perspective of a logical function. The CU and the DU may be physically separated or deployed together. A plurality of DUs may share one CU. One DU may alternatively be connected to a plurality of CUs (not shown in the figure). The CU and the DU may be connected through an interface, for example, an F1 interface. The CU and the DU may be obtained through division based on protocol layers of a wireless network. For example, functions of a radio resource control (Radio Resource Control, RRC) layer, a service data adaptation protocol (Service Data Adaptation Protocol, SDAP) layer, and a packet data convergence protocol (packet data convergence protocol, PDCP) layer are deployed on the CU, and functions of a radio link control (radio link control, RLC) layer, a media access control (Media Access Control, MAC) layer, a physical (physical, PHY) layer, and the like are deployed on the DU. It may be understood that, division into processing functions of the CU and the DU based on the protocol layers is merely an example, and there may be other division. For example, the CU or the DU may have functions of more protocol layers through division. For example, the CU or the DU may alternatively have some processing functions of the protocol layers through division. In a design, some functions of the RLC layer and a function of a protocol layer above the RLC layer are deployed on the CU, and remaining functions of the RLC layer and a function of a protocol layer below the RLC layer are deployed on the DU. In another design, functions of the CU or the DU may alternatively be obtained through division based on a service type or another system requirement. For example, division is performed based on a latency, a function whose processing time needs to meet a latency requirement is deployed on the DU, and a function whose processing time does not need to meet the latency requirement is deployed on the CU. In another design, the CU may alternatively have one or more functions of the core network. One or more CUs may be disposed in a centralized manner or a separated manner. For example, the CUs may be disposed on a network side for ease of centralized management. The DU may have a plurality of radio frequency functions, or the radio frequency functions may be disposed remotely.

Functions of the CU may be implemented by one entity, or may be implemented by different entities. For example, the functions of the CU may be further divided. For example, a control plane (CP) is separated from a user plane (UP), in other words, a CU control plane (CU-CP) and a CU user plane (CU-UP) are obtained. For example, the CU-CP and the CU-UP may be implemented by different function entities. The CU-CP and the CU-UP may be coupled to the DU to jointly implement functions of the base station. In a possible manner, the CU-CP is responsible for control plane functions, and mainly includes RRC and PDCP-C. The PDCP-C is mainly responsible for data encryption and decryption, integrity protection, data transmission, and the like on a control plane. The CU-UP is responsible for user plane functions, and mainly includes SDAP and PDCP-U. The SDAP is mainly responsible for processing data of the core network and mapping a data flow (flow) to a bearer. The PDCP-U is mainly responsible for data encryption and decryption, integrity protection, header compression, serial number maintenance, data transmission, and the like on a user plane. The CU-CP and the CU-UP are connected through an E1 interface. On behalf of the gNB, the CU-CP is connected to the core network through an Ng interface, and is connected to the DU through F1-C(control plane). The CU-UP is connected to the DU through F1-U (user plane). Certainly, in another possible implementation, the PDCP-C is also on the CU-UP.

Wireless communications apparatus: The wireless communications apparatus may be a terminal device, a chip, or a chipset. The terminal device may be a wireless terminal device. The wireless terminal device may be a device having a wireless transceiver function, and may be deployed on land, including an indoor device, an outdoor device, a handheld device, or a vehicle-mounted device; or may be deployed on a water surface (for example, on a ship); or may be deployed in the air (for example, on an airplane, a balloon, or a satellite). The terminal device may be a mobile phone (mobile phone), a tablet computer (Pad), a computer with a wireless transceiver function, a virtual reality (Virtual Reality, VR) terminal, an augmented reality (Augmented Reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. This is not limited herein. It may be understood that, in embodiments of this application, the terminal device may also be referred to as user equipment (user equipment, UE). The chip may be a chip used in the terminal device. The chip is configured to implement communication between the terminal device and a network device. For example, the chip has a wireless transceiver function and/or an information processing function. The chipset may be a chipset used in the terminal device. The chipset includes a plurality of chips. The chipset is configured to implement communication between the terminal device and a network device. For example, the chipset has a wireless transceiver function and/or an information processing function. In some embodiments, the terminal device has a circuit configured to communicate with the network device. The circuit may be integrated into one or more integrated circuits (ICs), and the one or more integrated circuits (ICs) may be encapsulated in one or more chips. The following uses an example in which the wireless communications apparatus is a terminal device for description. The following terminal device may alternatively be replaced with a wireless communications apparatus such as a chip or a chipset.

In a 5G mobile communications system, a status of a terminal device includes a connected (connected) state, an idle (idle) state, and an inactive (inactive) state. When the terminal device is in the connected state, the terminal device establishes an air interface connection to the network device, and communicates with the network device through the air interface connection. When the terminal device is in the idle state or the inactive state, the air interface connection between the terminal device and the network device is disconnected, and the terminal device may receive broadcast information sent by the network device. When the terminal device is in the inactive state, the air interface connection between the terminal device and the network device is disconnected, but the terminal device continues to store context information. When the terminal device enters the connected state from the inactive state, the terminal device can be quickly restored to the connected state based on the stored context information.

In a 5G communications system, a reference signal may be used by user equipment (user equipment, UE) for automatic gain control (Automatic Gain Control, AGC) adjustment, time and frequency synchronization, beam measurement, radio resource management (Radio Resource Management, RRM) measurement, and the like. When the terminal device is in an inactive state or an idle state, the terminal device periodically receives paging (paging, paging, including control information (control information) and a paging message (paging message)) sent by the network device. A specific process is as follows: When the terminal device in the inactive state or the idle state has a downlink service generated, the network device needs to notify the terminal device that there is the downlink service, and enable the terminal device to enter the connected state. Currently, the network device sends a paging message to notify the terminal device that there is the downlink service. The terminal device periodically monitors the paging message to avoid excessively high power consumption of the terminal device. One paging occasion (paging occasion, PO) occurs in each cycle (paging DRX cycle). The network device may deliver paging on the PO, and the terminal device detects whether there is the paging.

When monitoring the paging message, the terminal device first needs to monitor paging downlink control information (downlink control information. DCI). The paging DCI is identified by using a paging radio network temporary identifier (radio network temporary identifier, RNTI). Only UE to which a corresponding P-RNTI (paging RNTI) is allocated can detect the paging DCI. After receiving the paging DCI, the terminal device (usually a plurality of terminal devices) receives, according to an indication of the paging DCI, a physical downlink shared channel (Physical Downlink Shared Channel, PDSCH) carrying the paging message. If the terminal device detects an identity (Identity, ID) of the terminal device in the paging message, the terminal device initiates a random access procedure to enter the connected state. In short, the paging DCI may be used to notify a group of terminal devices that "a terminal device may need to enter the connected state", and the paging message further notifies the group of terminal devices of which terminal device actually needs to enter the connected state.

Figure 1:
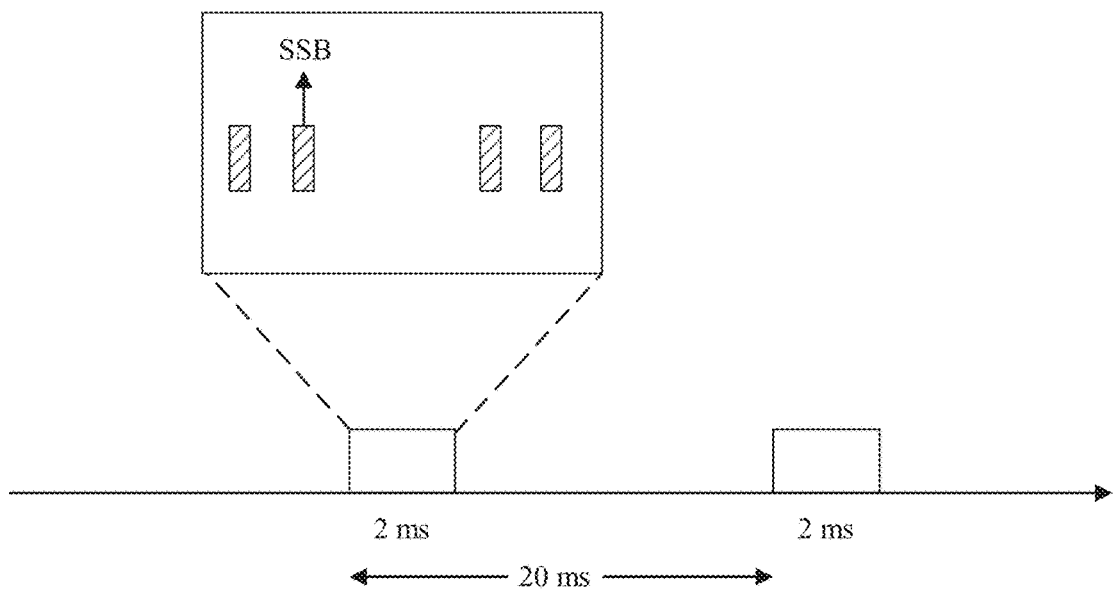
FIG. 1 is a schematic diagram of a configuration of an SSB.
Figure 2:
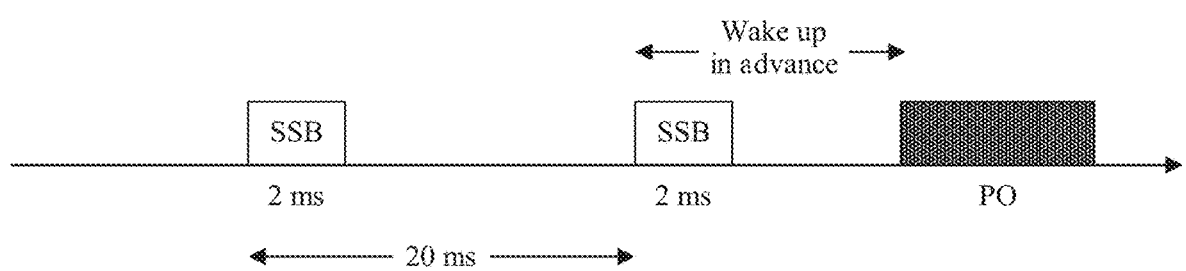
FIG. 2 is a schematic diagram in which UE wakes up in advance and receives an SSB.

Before receiving the paging DCI on the PO, the terminal device needs to perform operations such as AGC adjustment and time and frequency synchronization in advance, to ensure that receiving performance of the paging DCI is high enough. A reference signal sent by the network device needs to be used for these operations. However, in a 5G mobile communications system, in an implementation, the reference signal is transmitted by using an SSB. Because an SSB periodicity may be long, in an extreme case, the terminal device may need to wake up a long time (for example, 20 ms, as shown in FIG. 2) in advance. In this case, a sleep time period of the terminal device is shortened. This causes a waste of power consumption of the terminal device.

In embodiments of this application, when a terminal device is in a non-connected state, the terminal device can wake up at a late moment before a PO and receive a first reference signal (which is used for operations such as AGC adjustment and time and frequency synchronization). This can reduce a waste of power consumption caused when the terminal device wakes up in advance at a location of an SSB. For a purpose of enabling the terminal device to wake up at a location of the first reference signal, the terminal device may receive, in the non-connected state, information (for example, first information) for configuring the first reference signal, may learn of a sending moment of the first reference signal based on the first information, and may wake up at the location of the first reference signal. The first reference signal is closer to the PO than the SSB. Therefore, power consumption of the terminal device can be effectively reduced. The following provides specific descriptions with reference to embodiments of this application.

Figure 5:
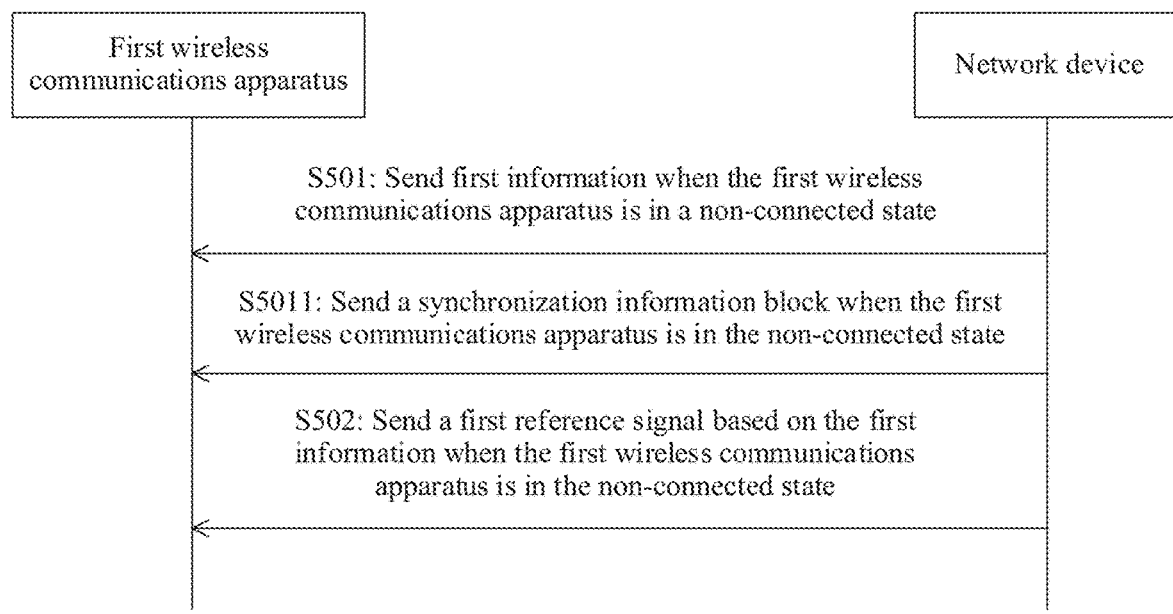
FIG. 5 is a flowchart of a communications method according to an embodiment of this application.

FIG. 5 is a flowchart of a communications method according to an embodiment of this application. As shown in FIG. 5, the method in this embodiment may include the following steps.

S501: When a first wireless communications apparatus is in a non-connected state, a network device sends a system information block to the first wireless communications apparatus (for example, first UE), where the system information block includes first information, and the first information includes configuration information of a first reference signal. Correspondingly, the first wireless communications apparatus receives the system information block when the first wireless communications apparatus is in the non-connected state.

In this embodiment, the network device determines the configuration information of the first reference signal, and then the network device sends the first information to the first wireless communications apparatus, where the first information includes the configuration information of the first reference signal. The configuration information is used to enable the first wireless communications apparatus to receive the first reference signal, and the configuration information may include one or more of a time location, a sending periodicity, a frequency location, a frequency density, a sequence generation parameter, and QCL (Quasi-co-located, quasi co-location) information of the first reference signal. For example, the sequence generation parameter may be a scrambling ID (scrambling ID), and the sequence generation parameter is used to generate a pseudo-random sequence, so as to generate a reference sequence based on the pseudo-random sequence.

In some embodiments, when a channel condition is poor, operations such as AGC adjustment and time and frequency synchronization may not be completed for one PO by using one first reference signal, and the network device may send a plurality of first reference signals to the first wireless communications apparatus. When the network device sends the plurality of first reference signals, the first information may include a plurality of pieces of configuration information, and each piece of configuration information may include one or more of a time location, a sending periodicity, a frequency location, a frequency density, a sequence generation parameter, and QCL (Quasi-co-located, quasi co-location) information of one of the first reference signals. When the network device sends the plurality of first reference signals (the plurality of first reference signals may be used separately for AGC adjustment and time and frequency synchronization, and the plurality of first reference signals are all valid), the first wireless communications apparatus may further determine which first reference signal is closer to the PO, and choose to receive one or more first reference signals closer to the PO, to more effectively reduce power consumption of the first wireless communications apparatus.

That the first wireless communications apparatus is in a non-connected state includes: The first wireless communications apparatus is in an inactive state or an idle state. For example, the first wireless communications apparatus has been connected to the network device, and the first wireless communications apparatus enters an inactive state or an idle state from a connected state. Alternatively, the first wireless communications apparatus has not been connected to the network device, the first wireless communications apparatus has just entered a cell in which the network device is located, and the first wireless communications apparatus is in an inactive state or an idle state.

S502: When the first wireless communications apparatus is in the non-connected state, the network device sends the first reference signal to the first wireless communications apparatus based on the configuration information of the first reference signal. Correspondingly, when the first wireless communications apparatus is in the non-connected state, the first wireless communications apparatus receives the first reference signal from the network device based on the configuration information of the first reference signal.

In this embodiment, when the first wireless communications apparatus is in the non-connected state, the network device sends the first reference signal to the first wireless communications apparatus based on the configuration information of the first reference signal in S501. Correspondingly, when the first wireless communications apparatus is in the non-connected state, the first wireless communications apparatus receives the first reference signal from the network device based on the configuration information of the first reference signal that is received from the network device in S501. An SSB is periodically sent by the network device. The first wireless communications apparatus may determine a sending time point of the SSB, and the first wireless communications apparatus may determine a sending time point of the first reference signal based on the configuration information of the first reference signal. The first reference signal is closer to the PO than the SSB, that is, the first reference signal is closer to the PO. In this case, the first wireless communications apparatus wakes up at a location of the first reference signal, and receives the first reference signal (which is used to better receive paging) based on the first information. This can prevent the first wireless communications apparatus from waking up too early at a location of the SSB, so that power consumption of the first wireless communications apparatus is reduced.

In some embodiments, if the first wireless communications apparatus determines that the SSB is closer to the PO, the first wireless communications apparatus wakes up at a location of the SSB, to reduce power consumption of the first wireless communications apparatus, and perform operations such as AGC adjustment and time and frequency synchronization in a timely manner.

In a possible implementation, the network device and the first wireless communications apparatus are located in a same cell, and there is a second wireless communications apparatus in the cell. When the second wireless communications apparatus is in a connected state, the network device further sends third information, where the third information includes configuration information of a second reference signal, and the second reference signal is a reference signal that can be used when the second wireless communications apparatus is in the connected state. In an embodiment, the network device may use the second reference signal as a subset of the first reference signal, and broadcast the configuration information of the second reference signal as at least a part of the configuration information of the first reference signal for the first wireless communications apparatus to perform operations such as AGC adjustment and time and frequency synchronization. Because the network device needs to send the third information to the second wireless communications apparatus when the second wireless communications apparatus is in the connected state, there is no need to introduce cell-level configuration information. According to the foregoing configuration method, a same reference signal may be used by the first wireless communications apparatus that is in the non-connected state, and may also be used by the second wireless communications apparatus that is in the connected state. This can save resources of the reference signal.

In some embodiments, the first wireless communications apparatus may include a processor and a memory. After the first wireless communications apparatus receives the first information, the processor of the first wireless communications apparatus parses the first information to obtain a receiving parameter of the first reference signal. The receiving parameter is used by the first wireless communications apparatus to receive the first reference signal at a proper time point and frequency, and perform processing (for example, perform correlation) on the first reference signal to obtain information about time offset, frequency offset, and the like of a receiver of the first wireless communications apparatus. A component such as a chip or the receiver of the first wireless communications apparatus may be adjusted based on the receiving parameter, to receive the first reference signal. The receiving parameter may be stored in the memory. If a status of the first reference signal is valid, the first wireless communications apparatus invokes and obtains the receiving parameter from the memory, and receives the first reference signal from the network device based on the receiving parameter.

The configuration information that is of the first reference signal and that is indicated by the first information may be configuration information of the first wireless communications apparatus when the first wireless communications apparatus is in an inactive state or an idle state. Correspondingly, when the first wireless communications apparatus is in the inactive state or the idle state, the network device sends the first reference signal to the first wireless communications apparatus, and the first wireless communications apparatus receives the first reference signal from the network device based on the configuration information. In this case, the first wireless communications apparatus does not need to wake up from a dormant state early when the first wireless communications apparatus is in the inactive state, to receive the first reference signal. This reduces power consumption of the first wireless communications apparatus.

In some embodiments, if the network device finds that for one first wireless communications apparatus, a first reference signal is located between an SSB and a PO, the network device may broadcast the first information: or if the network device finds that for any first wireless communications apparatus, no first reference signal is located between an SSB and a PO, the network device may not broadcast the first information, to reduce signaling overheads.

In an embodiment, each first reference signal corresponds to one piece of configuration information, and each piece of configuration information corresponds to one validity status. For example, a first reference signal 1 corresponds to configuration information 1 (the configuration information 1 includes a time location 1, a sending periodicity 1, a frequency location 1, a frequency density 1, a sequence generation parameter 1, QCL information 1, and the like of the first reference signal 1), and the configuration information 1 corresponds to a validity status 1. A first reference signal 2 corresponds to configuration information 2 (the configuration information 2 includes a time location 2, a sending periodicity 2, a frequency location 2, a frequency density 2, a sequence generation parameter 2, QCL information 2, and the like of the first reference signal 2), and the configuration information 2 corresponds to a validity status 2; and so on.

In some embodiments, the first reference signal is used for one or more of time synchronization, frequency synchronization, gain adjustment, channel state measurement, link quality monitoring, or radio resource management, and is used by the first wireless communications apparatus (for example, UE) to better receive paging on the PO. The time synchronization refers to adjustment by the first wireless communications apparatus to a local clock. Alignment with a frame boundary, a subframe boundary, a slot boundary, and a symbol boundary of a received downlink signal is implemented in terms of time through the adjustment. The frequency synchronization refers to adjustment to an oscillator of the first wireless communications apparatus. Alignment with a carrier boundary and a subcarrier boundary of a received downlink signal is implemented in terms of frequency through the adjustment. The gain adjustment refers to adjustment by the first wireless communications apparatus to a received power amplifier of the first wireless communications apparatus. An amplitude of a received signal is enabled to be scaled to a proper range through the adjustment. This avoids both low precision caused by an excessively low amplitude of the signal and signal distortion caused by an excessively high amplitude of the signal. The channel state measurement refers to measurement performed by the first wireless communications apparatus and/or the network device on a channel state of a downlink channel from the network device to the first wireless communications apparatus. The link quality monitoring refers to monitoring performed by the first wireless communications apparatus and/or the network device on quality of a downlink channel from the network device to the first wireless communications apparatus. Monitoring indicators include reference signal received power (reference signal received power, RSRP), reference signal received quality (reference signal received quality. RSRQ), and the like. The radio resource management refers to planning and scheduling performed by the first wireless communications apparatus and/or the network device on air interface resources for a mobile communications system, and management of all radio resources, such as sites, sectors, and carriers, including establishment, monitoring, modification, and deletion. When the first wireless communications apparatus is in the non-connected state, the first wireless communications apparatus may enter a connected state based on received paging. There may be one or more types of first reference signals mentioned in the foregoing embodiments. For example, the first reference signal may be any one or more of a channel state information first reference signal (channel state information reference signal, CSI-RS), a tracking first reference signal (tracking reference signal, TRS), a primary synchronization signal (primary synchronization signal, PSS), and a secondary synchronization signal (secondary synchronization signal, SSS), or may be another first reference signal. This is not limited.

When the first wireless communications apparatus is in the idle state or the inactive state, the first wireless communications apparatus may still receive broadcast information sent by the network device. The broadcast message includes the first information. This may ensure that the first wireless communications apparatus receives the first message in the non-connected state. The broadcast information includes a master information block (MIB, master information block) and one or more system information blocks (SIBs, system information blocks). There are a plurality of types of system information blocks, for example, a system information block 1 (SIB 1, system information block 1), a system information block 2 (SIB 2, system information block 2), . . . , and a system information block 9 (SIB 9, system information block 9). In some embodiments, the SIB 1 is information necessary for accessing a network, the SIB 2 to the SIB 5 are information for cell reselection and measurement, the SIB 6 to the SIB 8 are information for earthquake and tsunami warning, and the SIB 9 is information for GPS timing (satellite timing). The SIB 1 has limited space, and other SIB messages (for example, the SIB 2 to the SIB 9) have larger space than the SIB 1. The SIB 1 is periodically sent. Whether to send other SIB messages is indicated by the SIB 1, and a sending location is indicated by the SIB 1.

In some embodiments, the first information is included in other types of SIBs (that is, the SIB 2 to an SIB y, y≥3) other than the SIB 1. Available/free space of the SIB 2 to the SIB y is larger than available/free space of the SIB 1, and can accommodate the configuration information of the first reference signal. In addition, the first information does not change frequently. Therefore, excessively frequent sending of the first information can be avoided by putting the first information in the SIB 2 to the SIB y, so that increasing of signaling overheads is avoided. For example, the first information is included in the SIB 2 to the SIB 9, or the first information is included in a specially newly introduced SIB (for example, an SIB 10 or an SIB 11). The first information may be included in one or more SIBs, to conveniently put the first information in the SIBs.

In some embodiments, the network device further sends second information to the first wireless communications apparatus, where the second information indicates a validity status of the first reference signal (that is, the status of the first reference signal). Correspondingly, the first wireless communications apparatus receives the second information from the network device, and a frequency at which the first wireless communications apparatus receives the second information is greater than a frequency at which the first wireless communications apparatus receives the first information.

If the second information indicates that the first reference signal is valid (that is, the status of the first reference signal meets a condition), the first wireless communications apparatus receives the first reference signal from the network device. In a specific embodiment, if the second information indicates that the first reference signal is valid (that is, a resource corresponding to the first reference signal is available, available), the first wireless communications apparatus wakes up at the location of the first reference signal based on the first information, and receives the first reference signal. This can effectively reduce power consumption of the terminal device.

If the second information indicates that the first reference signal is invalid (that is, the status of the first reference signal does not meet the condition), the first reference signal is not received. In a specific embodiment, as shown in step S5011 in FIG. 5, if the second information indicates that the first reference signal is invalid (that is, the resource corresponding to the first reference signal is not available, not available), the first wireless communications apparatus wakes up at the location of the SSB signal, and receives the SSB signal instead of the first reference signal, to avoid not performing operations such as AGC adjustment or time and frequency synchronization when the first reference signal is invalid.

Therefore, the network device may indicate the validity status of the first reference signal to the first wireless communications apparatus, to provide more flexibility for resource control of the network device. For example, a change of the validity status of the first reference signal may be related to the second wireless communications apparatus. For example, if the second wireless communications apparatus is in the connected state, the first reference signal may be valid; or if the second wireless communications apparatus is in a non-connected state, the first reference signal may be invalid.

In an embodiment, if the first information is included in the other types of SIBs (that is, the SIB 2 to the SIB y) other than the SIB 1, the first wireless communications apparatus needs to read the corresponding other types of SIBs (that is, the SIB 2 to the SIB y) each time, to obtain the configuration information of the first reference signal. Usually, the configuration information of the first reference signal does not change frequently, and the validity status of the first reference signal changes frequently. The validity status of the first reference signal is indicated by the second information, so that the corresponding other types of SIBs do not need to be frequently sent for updating the "validity status of the first reference signal". This can reduce signaling overheads.

In addition, in some embodiments, the status of the first reference signal may further include "possibly valid (the resource corresponding to the first reference signal may be available, may be available)" or "possibly invalid (that is, the resource corresponding to the first reference signal may be not available, may be not available)". If the second wireless communications apparatus may enter the connected state from the non-connected state, the first reference signal may be "possibly valid". If the second wireless communications apparatus may enter the non-connected state from the connected state, the first reference signal may be "possibly invalid".

The second information may indicate a status of one first reference signal by using one or more bits. For example, when the second information corresponds to one first reference signal by using each bit, M bits are needed to correspond to M first reference signals. When a bit is '0', it indicates that a corresponding first reference signal is "invalid" or "possibly invalid". When the corresponding first reference signal is "invalid", the first wireless communications apparatus receives the SSB instead of the first reference signal. When the corresponding first reference signal is "possibly invalid", the first wireless communications apparatus may perform blind detection to determine whether the first wireless communications apparatus needs to receive the first reference signal (for example, the blind detection may include power detection, and if power of the first wireless communications apparatus is high, the first wireless communications apparatus receives the first reference signal). For example, when a bit is '1', it indicates that a corresponding first reference signal is "valid" or "possibly valid". When the corresponding first reference signal is "valid", the first wireless communications apparatus receives the first reference signal instead of the SSB. When the corresponding first reference signal is "possibly valid", the first wireless communications apparatus may perform blind detection to determine whether the first wireless communications apparatus needs to receive the first reference signal (for example, the blind detection may include power detection, and if power of the first wireless communications apparatus is high, the first wireless communications apparatus receives the first reference signal). In addition, the one-bit indication method may be performed in an opposite manner. To be specific, '0' and '1' represent meanings opposite to those in the foregoing examples. Details are not described again. In addition, the second information corresponds to one first reference signal by using two bits. For example, '00', '01', '10', and '11' respectively represent that the first reference signal is "invalid", "possibly invalid", "possibly valid", and "valid". For a processing method of the first wireless communications apparatus, refer to the processing performed when each bit corresponds to one first reference signal. Details are not described herein again.

The following specifically describes three possible implementations of the second information.

The network device sends the system information block 1 (system information block 1, SIB 1 for short). The SIB 1 includes the second information. Signaling overheads of the second information are low, and the second information may be put in the SIB 1. The SIB 1 is periodically sent, so that the status of the first reference signal can be indicated to the first wireless communications apparatus in a timely manner. Correspondingly, the first wireless communications apparatus receives the SIB 1 from the network device, to update the status of the first reference signal. For example, when the network device broadcasts configuration information of M first reference signals, the network device indicates statuses of the M first reference signals by using a bitmap (bitmap), and M is an integer greater than or equal to 1. Because signaling overheads of the bitmap are not large, the bitmap may be put in the SIB 1. In addition, the first wireless communications apparatus reads the SIB 1 more frequently than reads the SIB 2 to the SIB y. Therefore, the status of the first reference signal can be obtained more quickly. The first wireless communications apparatus having a capability and a power consumption requirement may first read the configuration information of the M first reference signal resources from the other SIBs (that is, the SIB 2 to the SIB y). In a subsequent working process, the validity status of the first reference signal is determined based on the bitmap in the SIB 1. The bitmap may indicate a status of one first reference signal by using one or more bits. A specific method is described above, and details are not described herein again.

Because the first wireless communications apparatus also needs to periodically read the SIB 1 when working normally in the non-connected state, putting the bitmap in the SIB 1 does not increase additional power consumption of the first wireless communications apparatus. The first wireless communications apparatus does not need to read complete configuration information each time (the complete configuration information includes a time location, a sending periodicity, a frequency location, a frequency density, a sequence generation parameter, QCL information, and the like of a reference signal, and therefore signaling overheads are large). The validity statuses of the M first reference signals can be indicated only by introducing one additional bitmap (having a small quantity of bits, for example, when each bit corresponds to one first reference signal, only M bits are needed). Therefore, power consumption of the first wireless communications apparatus is reduced more effectively, and network signaling overheads are reduced. In addition, the second information is included in the SIB 1. Therefore, even if the first wireless communications apparatus is in the non-connected state, the network device may indicate, to the first wireless communications apparatus, the validity status of the first reference signal when the first wireless communications apparatus is in the non-connected state, to ensure that the first wireless communications apparatus can learn of the information by using limited resources when resources are insufficient, and prevent the first wireless communications apparatus from performing incorrect measurement, synchronization/AGC adjustment or the like.

Figure 6:
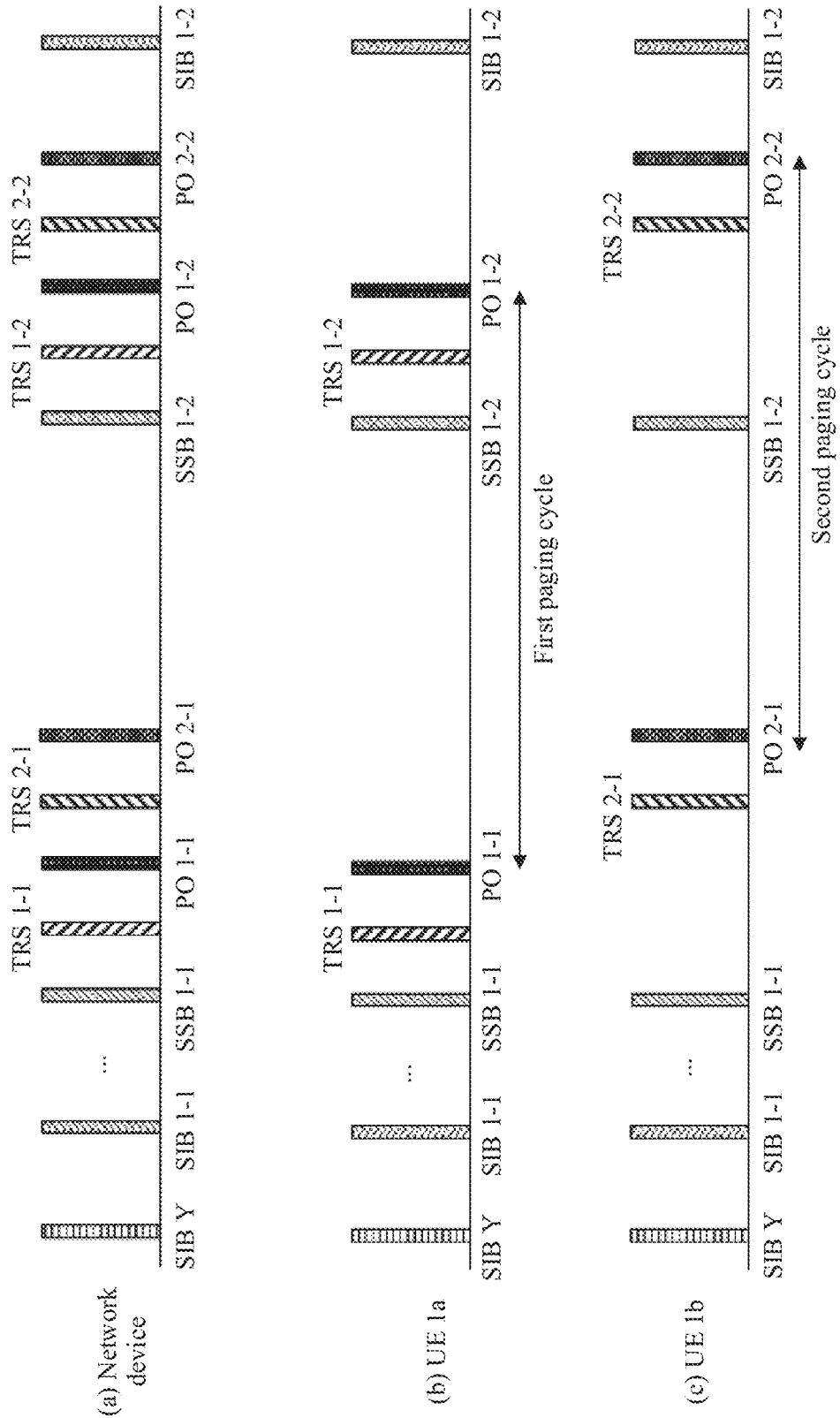
FIG. 6 is a schematic diagram of signals of devices according to an embodiment of this application.

FIG. 6 shows signals corresponding to devices in an embodiment. (a) in FIG. 6 represents a signal sent by a network device, (b) in FIG. 6 represents a signal received by a first wireless communications apparatus UE 1a, and (c) in FIG. 6 represents a signal received by a first wireless communications apparatus UE 1b. In FIG. 6, SIB Y represents the SIB 2 to the SIB y. SIB 1-1 represents a current SIB 1, and SIB 1-2 represents a next SIB 1. SSB 1-1 represents an SSB signal in a first SSB periodicity, and SSB 1-2 represents an SSB signal in a second SSB periodicity. TRS 1-1 represents a first reference signal of the first wireless communications apparatus UE 1a in the first SSB periodicity. PO 1-1 represents a paging occasion of the first wireless communications apparatus UE 1a in the first SSB periodicity. TRS 2-1 represents a first reference signal of the first wireless communications apparatus UE 1b in the first SSB periodicity. PO 2-1 represents a paging occasion of the first wireless communications apparatus UE 1b in the first SSB periodicity. TRS 1-2 represents a first reference signal of the first wireless communications apparatus UE 1a in the second SSB periodicity. PO 1-2 represents a paging occasion of the first wireless communications apparatus UE 1a in the second SSB periodicity. TRS 2-2 represents a first reference signal of the first wireless communications apparatus UE 1b in the second SSB periodicity. PO 2-2 represents a paging occasion of the first wireless communications apparatus UE 1b in the second SSB periodicity. A first paging cycle represents one paging cycle of the first wireless communications apparatus UE 1a, and a second paging cycle represents one paging cycle of the first wireless communications apparatus UE 1b.

In some embodiments, a "validity status" indicated by the SIB 1 may be validity statuses of all first reference signals from a location of the current SIB 1 to a location of the next SIB 1. For example, as shown in FIG. 6, there are four first reference signals between the current SIB1-1 and the next SIB1-2: the first reference signal TRS 1-1, the first reference signal TRS 2-1, the first reference signal TRS 1-2, and the first reference signal TRS 2-2. In this case, the current SIB1-1 indicates validity statuses of the first reference signal TRS 1-1, the first reference signal TRS 2-1, the first reference signal TRS 1-2, and the first reference signal TRS 2-2. In another embodiment, the "validity status" indicated by the SIB 1 may alternatively be validity statuses of all first reference signals from the location of the current SIB 1 to a location of a subsequent $K^{th}$ (K is an integer greater than or equal to 2) SIB 1. In other words, the SIB 1 may indicate validity statuses of first reference signals in a plurality of SIB 1 periodicities. For example, a value of K may be predefined in a standard, or may be configured by the network device through broadcast signaling, or may be obtained through calculation. For example, the SIB 1 indicates validity statuses of all first reference signals between one PO and a PO in a next cycle of the PO, and if the SIB 1 is sent L times between the two POs, it may be considered that K=L.

Operations such as AGC adjustment and time and frequency synchronization may be performed on the paging occasion PO 1-1 by using the first reference signal TRS 1-1. Operations such as AGC adjustment and time and frequency synchronization may be performed on the paging occasion PO 1-2 by using the first reference signal TRS 1-2 (and the first reference signal TRS 1-1). Operations such as AGC adjustment and time and frequency synchronization may be performed on the paging occasion PO 2-1 by using the first reference signal TRS 2-1. Operations such as AGC adjustment and time and frequency synchronization may be performed on the paging occasion PO 2-2 by using the first reference signal TRS 2-2 (and the first reference signal TRS 2-1).

In a Possible Implementation 2:

The network device sends a paging message (paging message). The paging message includes the second information. Signaling overheads of the second information are small, and the second information may be put in the paging message. The paging message is periodically sent, so that the status of the first reference signal can be indicated to the first wireless communications apparatus in a timely manner. Correspondingly, the first wireless communications apparatus receives the paging message from the network device, to update the status of the first reference signal. For example, when the network device broadcasts configuration information of the M first reference signals by using a paging message, the network device indicates statuses of the M first reference signals by using a bitmap (bitmap), and M is an integer greater than or equal to 1. Because signaling overheads of the bitmap are not large, the bitmap may be put in the paging message. In addition, the first wireless communications apparatus reads the paging message more frequently than reads the SIB 2 to the SIB y. Therefore, the first wireless communications apparatus can obtain the status of the first reference signal more quickly. The bitmap may indicate a status of one first reference signal by using one or more bits. A specific method is described above (that is, the second information may indicate a status of one first reference signal by using one or more bits), and details are not described herein again. The first wireless communications apparatus having a capability and a power consumption requirement may first read the configuration information of the M first reference signal resources from the other SIBs (that is, the SIB 2 to the SIB y). In a subsequent working process, the first wireless communications apparatus may read the bitmap after receiving paging DCI. The validity status of the first reference signal is determined based on the bitmap.

Because the first wireless communications apparatus also needs to periodically read the paging message when working normally in the non-connected state, putting the bitmap in the paging message does not increase additional power consumption of the first wireless communications apparatus. The first wireless communications apparatus does not need to read complete configuration information each time (the complete configuration information includes a time location, a sending periodicity, a frequency location, a frequency density, a sequence generation parameter, QCL information, and the like of a reference signal, and therefore signaling overheads are large). The validity statuses of the M first reference signals can be indicated only by introducing one additional bitmap (having a small quantity of bits, for example, when each bit corresponds to one first reference signal, only M bits are needed). Therefore, power consumption of the first wireless communications apparatus is reduced more effectively, and network signaling overheads are reduced. In addition, the second information is included in the paging message. Therefore, even if the first wireless communications apparatus is in the non-connected state, the network device may indicate, to the first wireless communications apparatus, the validity status of the first reference signal when the first wireless communications apparatus is in the non-connected state, to ensure that the first wireless communications apparatus can learn of the information by using limited resources when resources are insufficient, and prevent the first wireless communications apparatus from performing incorrect measurement/synchronization/AGC adjustment. In addition, the paging message is updated more frequently than the SIB 1 (the SIB 1 may be changed in a unit of day). Therefore, the validity status of the first reference signal can be updated in a more timely manner by putting the bitmap (or the second information) in the paging message. This avoids reading the SIB 1 more frequently to read the bitmap, and further reduces power consumption of the first wireless communications apparatus.

In some embodiments, the "validity statuses" of the M first reference signals indicated by the paging message may be validity statuses of all first reference signals between a current PO and a next PO. For example, as shown in FIG. 6, there are two first reference signals (the first reference signal TRS 2-1 and the first reference signal TRS 1-2) between the paging occasion PO 1-1 and the paging occasion PO 1-2, and a paging message of the paging occasion PO 1-1 indicates validity statuses of the first reference signal TRS 1-1 and the first reference signal TRS 1-2. There are two first reference signals (the first reference signal TRS 1-2 and the first reference signal TRS 2-2) between the paging occasion PO 2-1 and the paging occasion PO 2-2, and a paging message of the paging occasion PO 2-1 indicates validity statuses of the first reference signal TRS 1-2 and the first reference signal TRS 2-2. In another embodiment, the "validity status" indicated by the paging message may alternatively be validity statuses of all first reference signals from a location of the current PO to a location of a subsequent $K^{th}$ (K is an integer greater than or equal to 2) PO (that is, K paging cycles). In other words, the paging message may indicate validity statuses of first reference signals in a plurality of PO cycles.

Operations such as AGC adjustment and time and frequency synchronization may be performed on the paging occasion PO 1-1 by using the first reference signal TRS 1-1. Operations such as AGC adjustment and time and frequency synchronization may be performed on the paging occasion PO 1-2 by using the first reference signal TRS 1-2 (and the first reference signal TRS 1-1). Operations such as AGC adjustment and time and frequency synchronization may be performed on the paging occasion PO 2-1 by using the first reference signal TRS 2-1. Operations such as AGC adjustment and time and frequency synchronization may be performed on the paging occasion PO 2-2 by using the first reference signal TRS 2-2 (and the first reference signal TRS 2-1).

In a Possible Implementation 3:

The network device sends a paging message (paging message). The paging message includes the second information. Signaling overheads of the second information are small, and the second information may be put in the paging message. The paging message is periodically sent, so that the status of the first reference signal can be indicated to the first wireless communications apparatus in a timely manner. Correspondingly, the first wireless communications apparatus receives the paging message from the network device, to update the status of the first reference signal. For example, when the network device broadcasts configuration information of the M first reference signals (M is an integer greater than or equal to 1) by using a paging message, each first reference signal may be associated with one or more POs, and each PO may be associated with one or more first reference signals. The second information included in the paging message on a paging occasion (paging occasion, PO) indicates statuses of the N first reference signals (1≤N≤M).

In this way, the validity status of the first reference signal associated with a current PO can be indicated by using less signaling overheads.

In some embodiments, when the paging message indicates the "validity status", the paging message indicates statuses of the N first reference signals between a location of the current PO and a location of a next PO. To be specific, the paging message indicates statuses of all occasions of the N first reference signals between the location of the current PO and the location of the next PO. In another embodiment, the "validity status" indicated by the paging message may alternatively be validity statuses of all first reference signals from the location of the current PO to a location of a subsequent $K^h$ (K is an integer greater than or equal to 2) PO (that is, K paging cycles). In other words, the paging message may indicate validity statuses of first reference signals in a plurality of PO cycles.

As shown in FIG. 6, for the first wireless communications apparatus UE 1a, there are two first reference signals (the first reference signal TRS 2-1 and the first reference signal TRS 1-2) between the paging occasion PO 1-1 and the paging occasion PO 1-2, but the paging occasion PO 1-2 is associated with only the first reference signal TRS 1-2 and the paging occasion PO 1-2 is not associated with the first reference signal TRS 2-1 (operations such as AGC adjustment and time and frequency synchronization are performed on the paging occasion PO 1-2 by using the first reference signal TRS 1-2). In this case, a paging message on the paging occasion PO 1-1 indicates a validity status of the first reference signal TRS 1-2, and the paging message on the paging occasion PO 1-1 does not need to indicate a validity status of the first reference signal TRS 2-1. This can reduce signaling overheads. Similarly, for the first wireless communications apparatus UE 1b, there are two first reference signals (the first reference signal TRS 1-2 and the first reference signal TRS 2-2) between the paging occasion PO 2-1 and the paging occasion PO 2-2, but the paging occasion PO 2-2 is associated with only the first reference signal TRS 2-2 and the paging occasion PO 2-2 is not associated with the first reference signal TRS 1-2 (operations such as AGC adjustment and time and frequency synchronization are performed on the paging occasion PO 2-2 by using the first reference signal TRS 2-2). In this case, a paging message on the paging occasion PO 2-1 indicates a validity status of the first reference signal TRS 2-2, and the paging message on the paging occasion PO 2-1 does not need to indicate a validity status of the first reference signal TRS 2-1. This can reduce signaling overheads.

In another embodiment, the paging occasion PO 1-1 may be associated with a plurality of first reference signals TRS 1-1; or the paging occasion PO 1-2 may be associated with a plurality of first reference signals TRS 1-2; or the paging occasion PO 2-1 may be associated with a plurality of first reference signals TRS 2-1; or the paging occasion PO 2-2 may be associated with a plurality of first reference signals TRS 2-2; or both the first reference signal TRS 1-1 and the first reference signal TRS 2-1 are associated with the paging occasion PO 2-1; or both the first reference signal TRS 2-1 and the first reference signal TRS 1-2 are associated with the paging occasion PO 1-2, or the like. Details are not described herein.

The paging message may indicate a status of one first reference signal by using one or more bits. A specific method is described above (that is, the second information may indicate a status of one first reference signal by using one or more bits), and details are not described herein again. When the paging message may indicate a status of one first reference signal by using one bit, the paging message may indicate, by using N bits, validity statuses of the M first reference signals associated with the current PO.

In some embodiments, the first information further includes information about an association between the first reference signal and the PO, and the N first reference signals are N first reference signals associated with the PO. In other words, the association is determined through explicit configuration. Specifically, the network device may determine which first reference signal is associated with the PO of the first wireless communications apparatus. The network device notifies the first wireless communications apparatus of the association between the first reference signal and the PO by using the first information, and only needs to indicate, in the paging message, the validity statuses of the N first reference signals associated with the current PO. For example, in FIG. 6, the paging occasion PO 1-2 is associated with the first reference signal TRS 1-2. In this case, first information received by the first wireless communications apparatus UE 1a at the SIB Y on the paging occasion PO 1-1 indicates that the paging occasion PO 1-2 is associated with the first reference signal TRS 1-2; and a paging message received by the first wireless communications apparatus UE 1a on the paging occasion PO 1-1 may indicate only a validity status of the first reference signal TRS 1-2.

In some embodiments, the association is implicitly determined based on a location of the first reference signal and a location of the PO. For example, the N first reference signals are located before the paging occasion. Specifically, for example, as shown in FIG. 6, there are three first reference signals before the paging occasion PO 1-2: the first reference signal TRS 1-1, the first reference signal TRS 1-2, and the first reference signal TRS 2-1. The first reference signal TRS 2-2 is located after the paging occasion PO 1-2. In this case, the network device may determine that one or more of the first reference signal TRS 1-1, the first reference signal TRS 1-2, and the first reference signal TRS 2-1 are associated with the paging occasion PO 1-2, and the first reference signal TRS 2-2 is not associated with the paging occasion PO 1-2. The network device indicates validity statuses of one or more of the first reference signal TRS 1-1, the first reference signal TRS 1-2, and the first reference signal TRS 2-1 in a paging message on the paging occasion PO 1-1, and does not need to indicate a validity status of the first reference signal TRS 2-2. For another example, the first reference signal TRS 1-1 is located before the paging occasion PO 1-1, the paging occasion PO 2-1, and the paging occasion PO 1-2. In this case, all of the network device may determine that the paging occasion PO 1-1, the paging occasion PO 2-1, and the paging occasion PO 1-2 are associated with the first reference signal TRS 1-1. The first reference signal TRS 2-2 is located after the paging occasion PO 1-1, the paging occasion PO 2-1, and the paging occasion PO 1-2. In this case, the network device may determine that none of the paging occasion PO 1-1, the paging occasion PO 2-1, and the paging occasion PO 1-2 is associated with the first reference signal TRS 2-2.

Figure 7A:
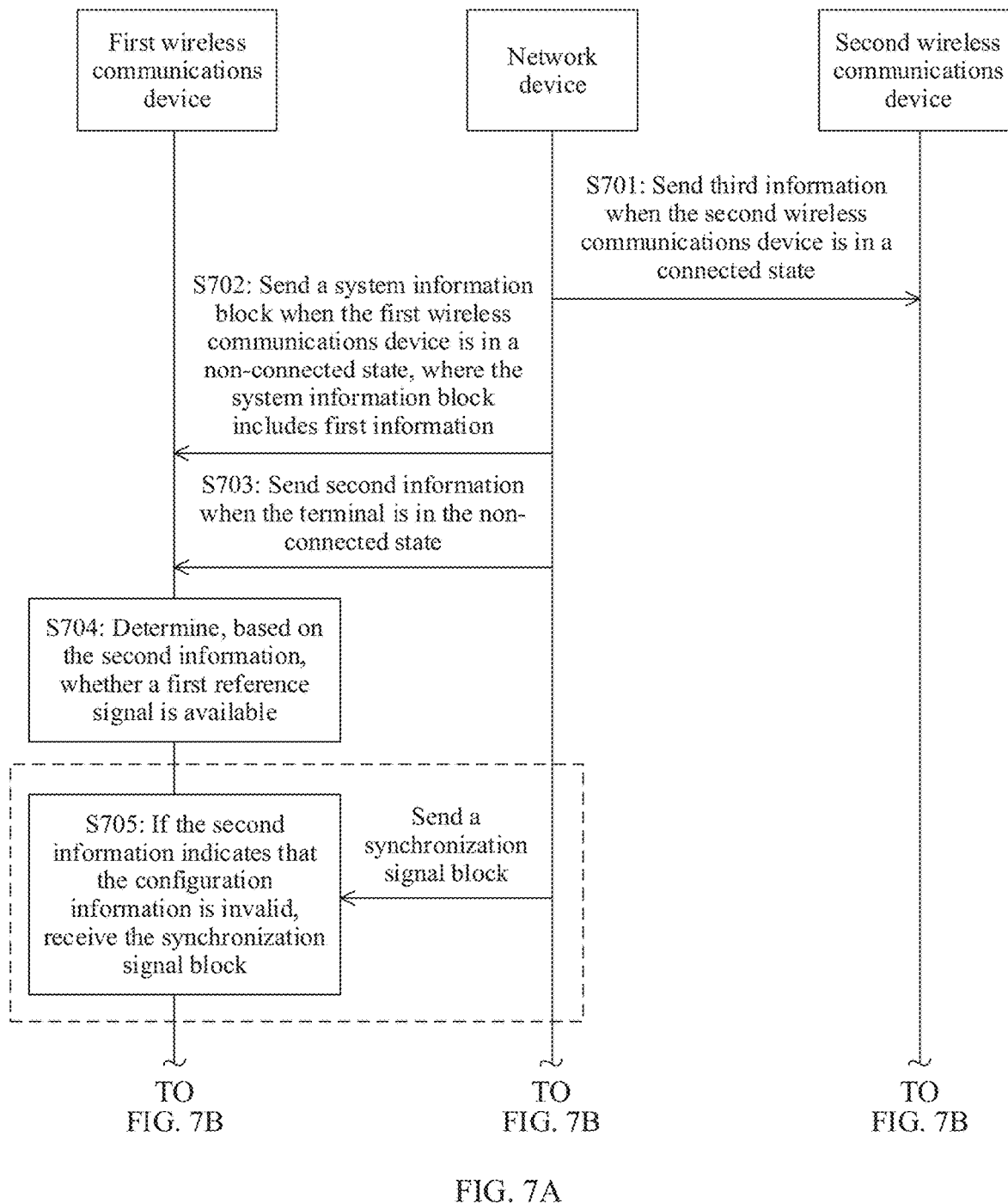
FIG. 7A and FIG. 7B are a flowchart of a communications method according to another embodiment of this application.
Figure 7B:
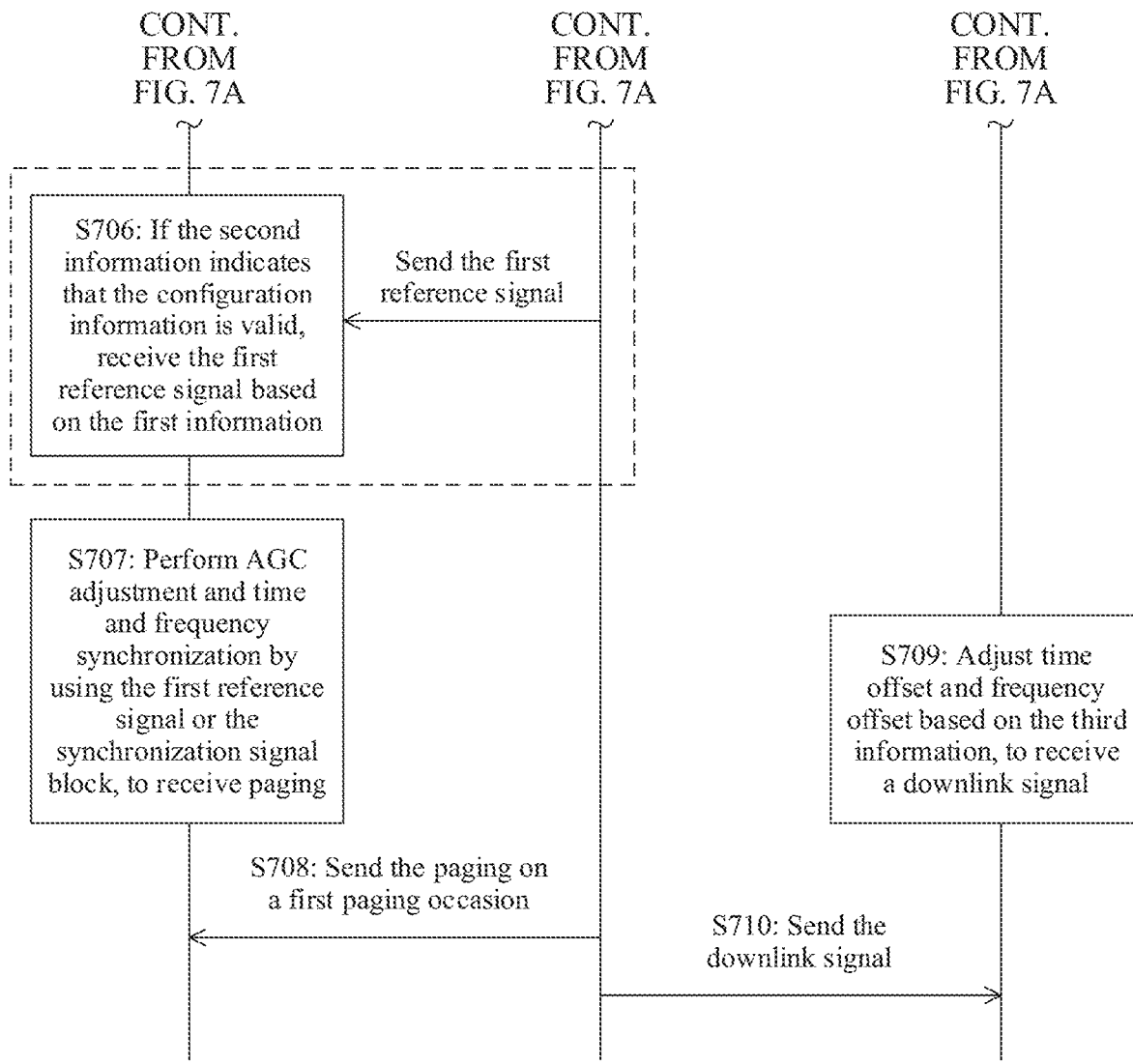

FIG. 7A and FIG. 7B are a flowchart of a communications method according to an embodiment of this application. The methods in the foregoing embodiments may be used for the steps in FIG. 7A and FIG. 7B, and same parts are not described again. As shown in FIG. 7A and FIG. 7B, the method in this embodiment may include the following steps.

Step S701: A network device sends third information when a second wireless communications apparatus is in a connected state. The network device and the second wireless communications apparatus (or second UE) are located in a same cell. The third information includes configuration information of a second reference signal, and the second reference signal is a reference signal that can be used when the second wireless communications apparatus is in the connected state. The network device may broadcast the configuration information of the second reference signal as at least a part of configuration information of a first reference signal (for example, the second reference signal may be combined into a first signal) for a first wireless communications apparatus to perform operations such as AGC adjustment and time and frequency synchronization. The second reference signal is a subset of the first reference signal. Correspondingly, the second wireless communications apparatus receives the third information when the second wireless communications apparatus is in the connected state. According to the foregoing configuration method, a same reference signal may be used by the first wireless communications apparatus that is in a non-connected state, and may also be used by the second wireless communications apparatus that is in the connected state. This can save resources of the reference signal.

S702: When the first wireless communications apparatus is in the non-connected state, the network device sends a system information block to the first wireless communications apparatus (or first UE), where the system information block includes first information, and the first information includes the configuration information of the first reference signal. Correspondingly, the first wireless communications apparatus receives the system information block from the network device when the first wireless communications apparatus is in the non-connected state. The first wireless communications apparatus parses the first information to obtain a receiving parameter, where the receiving parameter is for receiving the first reference signal. The first wireless communications apparatus may not read the first information first, and the first information may be stored in a memory of the first wireless communications apparatus. If the first reference signal is valid, the first wireless communications apparatus invokes the first information from the memory.

That the first wireless communications apparatus is in a non-connected state includes: The first wireless communications apparatus (or the first UE) is in an inactive state or an idle state. For example, the first wireless communications apparatus has been connected to the network device, and the first wireless communications apparatus enters an inactive state or an idle state from a connected state. Alternatively, the first wireless communications apparatus has not been connected to the network device, the first wireless communications apparatus has just entered the cell in which the network device is located, and the first wireless communications apparatus is in an inactive state or an idle state.

S703: When the first wireless communications apparatus is in the non-connected state, the network device sends second information to the first wireless communications apparatus, where the second information indicates a validity status (that is, a status) of the first reference signal. Correspondingly, the first wireless communications apparatus receives the second information from the network device, and a frequency at which the first wireless communications apparatus receives the second information is greater than a frequency at which the first wireless communications apparatus receives the first information. The second information may be any implementation in the foregoing embodiments, and details are not described herein again. The second information may indicate the validity status of the first reference signal. Therefore, the configuration information of the first reference signal does not need to be read each time. This can further reduce power consumption of the first wireless communications apparatus.

Step S704: The first wireless communications apparatus determines, based on the validity status of the first reference signal indicated by the second information, whether the first reference signal is available. If the first reference signal is valid (the status of the first reference signal meets a condition), the first reference signal is available; or if the first reference signal is invalid (the status of the first reference signal does not meet the condition), the first reference signal is not available.

In addition, the status of the first reference signal may further include "possibly valid (a resource corresponding to the first reference signal may be available, may be available)" or "possibly invalid (the resource corresponding to the first reference signal may be not available, may be not available)". If the second wireless communications apparatus may enter the connected state from a non-connected state, the first reference signal may be "possibly valid". If the second wireless communications apparatus may enter the non-connected state from the connected state, the first reference signal may be "possibly invalid". If the status of the first reference signal is possibly valid or possibly invalid, the first wireless communications apparatus may perform blind detection to determine whether the first reference signal needs to be received.

Step S705: If the second information indicates that the first reference signal is invalid (that is, the status of the first reference signal does not meet the condition), the first reference signal is not received. In a specific embodiment, if the second information indicates that the first reference signal is invalid (that is, the resource corresponding to the first reference signal is not available), the first wireless communications apparatus wakes up at a location of an SSB signal, and receives the SSB signal instead of the first reference signal, to avoid not performing operations such as AGC adjustment or time and frequency synchronization when the first reference signal is invalid.

Step S706: if the second information indicates that the first reference signal is valid (that is, the status of the first reference signal meets the condition), the first wireless communications apparatus receives the first reference signal from the network device based on the receiving parameter. In a specific embodiment, if the second information indicates that the first reference signal is valid (that is, the resource corresponding to the first reference signal is available), the first wireless communications apparatus wakes up at a location of the first reference signal based on the first information, and receives the first reference signal. This can effectively reduce power consumption of the terminal device. When the first wireless communications apparatus is in the non-connected state, the first wireless communications apparatus may determine a sending time point of the first reference signal based on the configuration information of the first reference signal. The first reference signal is closer to a PO than the SSB, that is, the first reference signal is closer to the PO. In this case, the first wireless communications apparatus wakes up at the location of the first reference signal, and receives the first reference signal (which is used to better receive paging) based on the first information. This can prevent the first wireless communications apparatus from waking up too early at the location of the SSB, so that power consumption of the first wireless communications apparatus is reduced.

Step S707: The first wireless communications apparatus performs operations such as AGC adjustment and time and frequency synchronization by using the received first reference signal or SSB, to better receive paging DCI.

Step S708: When the first wireless communications apparatus is in the non-connected state, the network device sends paging to the first wireless communications apparatus on a paging occasion (a paging occasion of the first wireless communications apparatus). Correspondingly, the first wireless communications apparatus receives the paging from the network device, to determine whether to enter the connected state.

Step S709: The second wireless communications apparatus adjusts time offset and frequency offset based on the third information, to better receive a downlink signal.

Step S710: When the second wireless communications apparatus is in the connected state, the network device sends the downlink signal to the second wireless communications apparatus. Correspondingly, the second wireless communications apparatus receives the downlink signal sent by the network device.

According to the method in the foregoing steps, power consumption of the second wireless communications apparatus can be effectively reduced, cell-level configuration information is not increased, and signaling overheads are not large.

The foregoing steps are not limited to a sequence shown in FIG. 7A and FIG. 7B. For example, step S709 may be at any location between step S701 and step S710, locations of step S708 and step S710 may be interchanged, locations of step S702 and step S703 may be interchanged, and so on.

Figure 8:
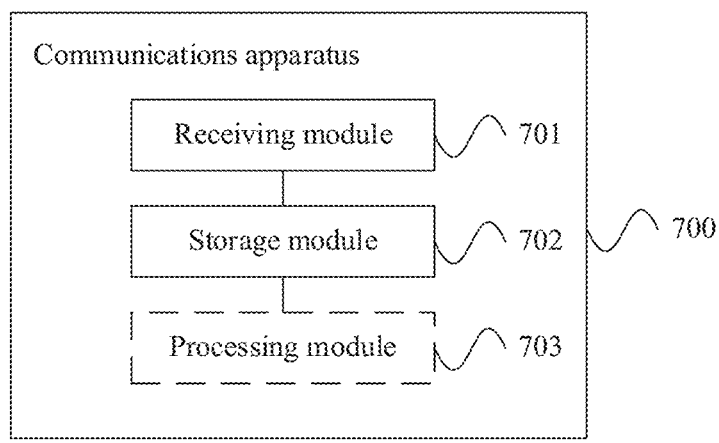
FIG. 8 is a schematic diagram of a structure of a communications apparatus according to an embodiment of this application.

FIG. 8 is a schematic diagram of a structure of a communications apparatus according to an embodiment of this application. As shown in FIG. 8, the communications apparatus may be a first wireless communications apparatus, or may be a component (for example, an integrated circuit or a chip) of the first wireless communications apparatus, or may be another communications module, and is configured to implement an operation corresponding to the first wireless communications apparatus in any one of the foregoing embodiments. For example, the first wireless communications apparatus is a terminal device, a chip, or a chipset. The communications apparatus 700 in this embodiment includes a receiving module 701. In an embodiment, the communications apparatus 700 in this embodiment may further include a storage module 702 and a processing module 703.

The receiving module 701 is configured to: when the wireless communications apparatus is in a non-connected state, receive first information, where the first information includes configuration information of a first reference signal, and the first reference signal is a reference signal that can be used when the wireless communications apparatus is in the non-connected state; and receive the first reference signal from a network device based on the first information.

In this embodiment, when the first wireless communications apparatus is in the non-connected state, the first wireless communications apparatus receives the first reference signal, and may determine a sending time point of the first reference signal based on the configuration information of the first reference signal. The first reference signal is closer to a PO than an SSB, that is, the first reference signal is closer to the PO. In this case, the first wireless communications apparatus wakes up at a location of the first reference signal, and receives the first reference signal (which is used to better receive paging) based on the first information. This can prevent the first wireless communications apparatus from waking up too early at a location of the SSB, so that power consumption of the first wireless communications apparatus is reduced.

In an embodiment, the first reference signal is used for one or more of time synchronization, frequency synchronization, gain adjustment, channel state measurement, link quality monitoring, or radio resource management.

In an embodiment, the storage module 702 is configured to store a receiving parameter.

In an embodiment, the non-connected state includes an inactive state or an idle state.

In an embodiment, the receiving module 701 is specifically configured to receive a broadcast message from the network device, where the broadcast message includes the first information. In a specific embodiment, the first information is included in at least one of a system information block 2 (system information block 2. SIB 2 for short) to a system information block y (system information block y, SIB y for short), and y≥3. Available/free space of the SIB 2 to the SIB y is larger than available/free space of an SIB 1, and can accommodate the configuration information of the first reference signal. In addition, the first information does not change frequently. Therefore, excessively frequent sending of the first information can be avoided by putting the first information in the SIB 2 to the SIB y. This avoids increasing of signaling overheads.

In an embodiment, the receiving module 701 is further configured to receive second information from the network device, where the second information indicates a status of the first reference signal. The processing module 703 is configured to: if the status of the first reference signal indicated by the second information meets a condition (that is, valid), receive the first reference signal from the network device based on the first information; or if the status of the first reference signal indicated by the second information does not meet the condition (that is, invalid), skip receiving the first reference signal. The network device may indicate the validity status of the first reference signal to the first wireless communications apparatus, to provide more flexibility for resource control of the network device.

In an embodiment, the receiving module 701 is specifically configured to: receive a system information block 1 (system information block 1, SIB 1 for short) from the network device, where the SIB 1 includes the second information; or receive a paging message (paging message) from the network device, where the paging message includes the second information. The second information is included in the SIB 1 or the paging message. In addition, the first wireless communications apparatus reads the second information more frequently than reads the first information. Therefore, the status of the first reference signal can be obtained more quickly, power consumption of the first wireless communications apparatus can be reduced more effectively, and network signaling overheads can be reduced.

In a specific embodiment, the first information includes M first reference signals, and M is an integer greater than or equal to 1. When the paging message includes the second information, the following is further included: The second information included in the paging message on a paging occasion (paging occasion. PO) indicates statuses of N first reference signals, and N is an integer less than or equal to M. This can further reduce signaling overheads. For example, when N is less than M, the first information further includes information about an association between the first reference signal and the PO, and the N first reference signals are N first reference signals associated with the PO; or when N is less than M, the N first reference signals are located before the paging occasion.

In an embodiment, the processing module 703 is further configured to: if the second information indicates that the first reference signal may be valid or may be invalid, control the first wireless communications apparatus to perform blind detection, and determine whether to receive the first reference signal.

The communications apparatus in this embodiment may be configured to execute the technical solutions of the first wireless communications apparatus in the foregoing method embodiments. Implementation principles and technical effects thereof are similar. Details are not described herein again.

Figure 9:
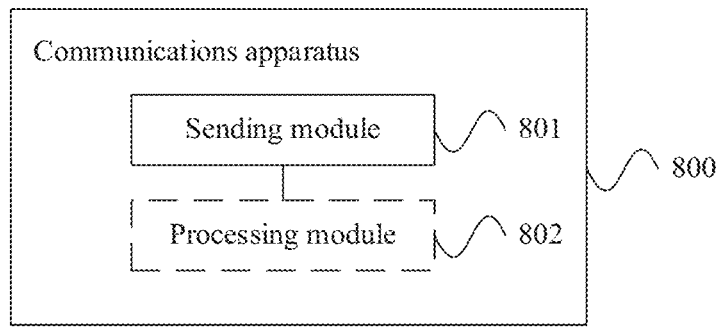
FIG. 9 is a schematic diagram of a structure of a communications apparatus according to another embodiment of this application.

FIG. 9 is a schematic diagram of a structure of a communications apparatus according to another embodiment of this application. As shown in FIG. 9, the communications apparatus may be a network device, or may be a component (for example, an integrated circuit or a chip) of the network device, or may be another communications module, and is configured to implement an operation corresponding to the network device in any one of the foregoing embodiments. The communications apparatus 800 in this embodiment includes a sending module 801.

The sending module 801 is configured to: when a first wireless communications apparatus is in a non-connected state, send first information to the first wireless communications apparatus, where the first information includes configuration information of a first reference signal, and the first reference signal is a reference signal that can be used when the first wireless communications apparatus is in the non-connected state; and send the first reference signal to the first wireless communications apparatus based on the configuration information.

In an embodiment, the communications apparatus in this embodiment may further include a processing module 802. The processing module 802 is configured to generate the first information before the sending module 801 sends the first information to the first wireless communications apparatus.

In an embodiment, the non-connected state includes one or more of an inactive state and an idle state.

In an embodiment, the sending module 801 is specifically configured to send a broadcast message to the first wireless communications apparatus, where the broadcast message includes the first information. In a specific embodiment, the first information is included in at least one of a system information block 2 (system information block 2. SIB 2 for short) to a system information block y (system information block y, SIB y for short), and y≥3.

In an embodiment, the sending module 801 is further configured to send second information to the first wireless communications apparatus, where the second information indicates a status of the first reference signal.

In an embodiment, the sending module 801 is specifically configured to:

send a system information block 1 (system information block 1, SIB 1 for short) to the first wireless communications apparatus, where the SIB 1 includes the second information; or send a paging message (paging message) to a terminal device, where the paging message includes the second information.

In an embodiment, the first information includes M first reference signals, and M is an integer greater than or equal to 1. When the paging message includes the second information, the following is further included:

The second information included in the paging message on a paging occasion (paging occasion, PO) indicates statuses of N first reference signals, and N is an integer less than or equal to M.

In an embodiment, when N is less than M, the second information further includes information about an association between the first reference signal and the PO, and the N first reference signals are N first reference signals associated with the PO; or when N is less than M, the N first reference signals are located before the paging occasion.

In an embodiment, the sending module 801 is further configured to receive third information from the network device when a second wireless communications apparatus is in a connected state, where the third information includes configuration information of a second reference signal, the second reference signal is a reference signal that can be used when the second wireless communications apparatus is in the connected state, and the second reference signal is a subset of the first reference signal.

The communications apparatus in this embodiment may be configured to execute the technical solutions of the network device in the foregoing method embodiments. Implementation principles and technical effects thereof are similar. Details are not described herein again.

Figure 10:
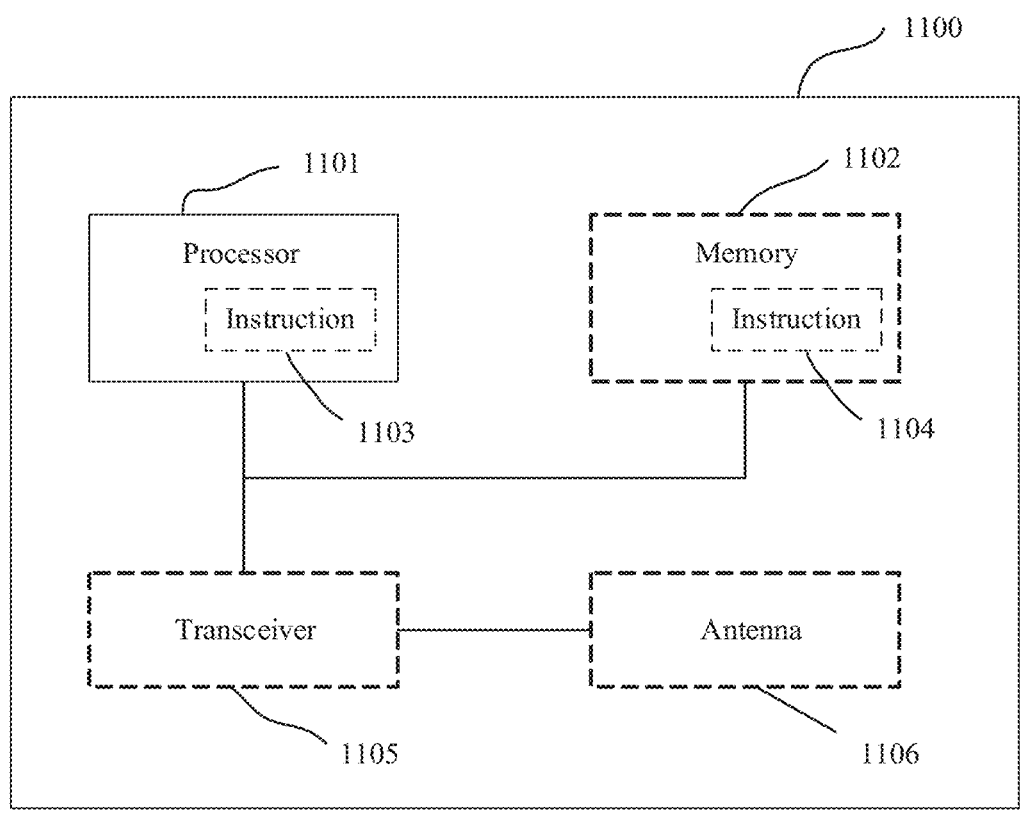
FIG. 10 is a schematic diagram of a structure of a communications apparatus according to another embodiment of this application.

FIG. 10 is a schematic diagram of a structure of a communications apparatus according to another embodiment of this application. As shown in FIG. 10, the communications apparatus 1100 in this embodiment may be the first wireless communications apparatus (or a component that can be used in the first wireless communications apparatus) or the network device (or a component that can be used in the network device) mentioned in the foregoing method embodiments. The communications apparatus may be configured to implement the method that corresponds to the first wireless communications apparatus or the network device and that is described in the foregoing method embodiments. For details, refer to descriptions in the foregoing method embodiments.

The communications apparatus 1100 may include one or more processors 1101. The processor 1101 may also be referred to as a processing unit, and may implement a specific control or processing function. The processor 1101 may be a general-purpose processor, a dedicated processor, or the like. For example, the processor may be a baseband processor or a central processing unit. The baseband processor may be configured to process a communication protocol and communication data. The central processing unit may be configured to: control the communications apparatus, execute a software program, and process data of the software program.

In a possible design, the processor 1101 may also store instructions 1103 or data (for example, intermediate data). The instructions 1103 may be run by the processor 1101, so that the communications apparatus 1100 performs the method that corresponds to the first wireless communications apparatus or the network device and that is described in the foregoing method embodiments.

In another possible design, the communications apparatus 1100 may include a circuit. The circuit may implement a sending, receiving, or communication function in the foregoing method embodiments.

In a possible implementation, the communications apparatus 1100 may include one or more memories 1102, and the memory 1102 may store instructions 1104. The instructions may be run on the processor, so that the communications apparatus 1100 performs the method described in the foregoing method embodiments.

In a possible implementation, the memory may also store data, for example, store a receiving parameter. The processor and the memory may be separately disposed, or may be integrated together.

In a possible implementation, the communications apparatus 1100 may further include a transceiver 1105 and/or an antenna 1106. The processor 1101 may be referred to as a processing unit, and controls the communications apparatus (for example, a first wireless communications apparatus, a core network device, or a radio access network device). The transceiver 1105 may be referred to as a transceiver unit, a transceiver machine, a transceiver circuit, a transceiver, or the like, and is configured to implement a transceiver function of the communications apparatus.

In a design, if the communications apparatus 1100 is configured to implement an operation corresponding to the first wireless communications apparatus in the foregoing embodiments. For example, the transceiver 1105 may receive first information when the first wireless communications apparatus is in a non-connected state, where the first information includes configuration information of a first reference signal, and the first reference signal is a reference signal that can be used when the first wireless communications apparatus is in the non-connected state. The transceiver 1105 receives the first reference signal from a network device based on the first information when the first wireless communications apparatus is in the non-connected state.

For another example, the processor 1101 stores the configuration information of the first reference signal into the memory 1102. If the processor 1101 determines that the first reference signal is valid, the processor 1101 invokes the configuration information of the first reference signal from the memory 1102.

For another example, the transceiver 1105 receives second information from the network device, where the second information indicates a validity status (that is, a status) of the first reference signal. If the second information indicates that the first reference signal is valid (that is, the status of the first reference signal meets a condition), the transceiver 1105 receives the first reference signal from the network device based on the configuration information of the first reference signal. If the second information indicates that the first reference signal is invalid (that is, the status of the first reference signal does not meet the condition), the transceiver 1105 receives an SSB signal instead of the first reference signal.

For specific implementation processes of the processor 1101 and the transceiver 1105, refer to the related descriptions in the foregoing embodiments. Details are not described herein again.

In another design, if the communications apparatus is configured to implement an operation corresponding to the network device in the foregoing embodiments. For example, when a first wireless communications apparatus is in a non-connected state, the transceiver 1105 sends first information to the first wireless communications apparatus, where the first information includes configuration information of a first reference signal, and the first reference signal is a reference signal that can be used when the first wireless communications apparatus is in the non-connected state: and sends the first reference signal to the first wireless communications apparatus based on the configuration information.

For another example, the processor 1101 is configured to generate the first information before the transceiver 1105 sends the first information to the first wireless communications apparatus. The processor 1101 is configured to determine a status of the first reference signal, and the transceiver 1105 sends second information to the first wireless communications apparatus, where the second information indicates the status of the first reference signal.

For specific implementation processes of the processor 1101 and the transceiver 1105, refer to the related descriptions in the foregoing embodiments. Details are not described herein again.

The processor 1101 and the transceiver 1105 described in this application may be implemented on an integrated circuit (integrated circuit, IC), an analog IC, a radio frequency integrated circuit (radio frequency integrated circuit, RFIC), a hybrid signal IC, an application-specific integrated circuit (application-specific integrated circuit, ASIC), a printed circuit board (printed circuit board, PCB), an electronic device, or the like. The processor and the transceiver may also be manufactured by using various IC processing technologies, for example, a complementary metal oxide semiconductor (complementary metal oxide semiconductor, CMOS), an n-channel metal oxide semiconductor (nMetal-oxide-semiconductor, NMOS), a p-channel metal oxide semiconductor (positive channel metal oxide semiconductor. PMOS), a bipolar junction transistor (Bipolar Junction Transistor, BJT), a bipolar CMOS (BiCMOS), silicon germanium (SiGe), and gallium arsenide (GaAs).

Although in the descriptions of the foregoing embodiments, the communications apparatus 1100 is described by using the first wireless communications apparatus or the network device as an example, the communications apparatus 1100 may alternatively be an independent device or may be a part of a large device. For example, the device may be:

(1) an independent integrated circuit IC, a chip, or a chip system or subsystem;
(2) a set of one or more ICs, where in a possible implementation, the IC set may further include a storage component configured to store data and/or instructions;
(3) an ASIC, for example, a modem (MSM);
(4) a module that can be embedded in another device;
(5) a receiver, a wireless device, a mobile unit, a network device, a cloud processing device, or the like.
(6) another device, or the like.

Figure 11:
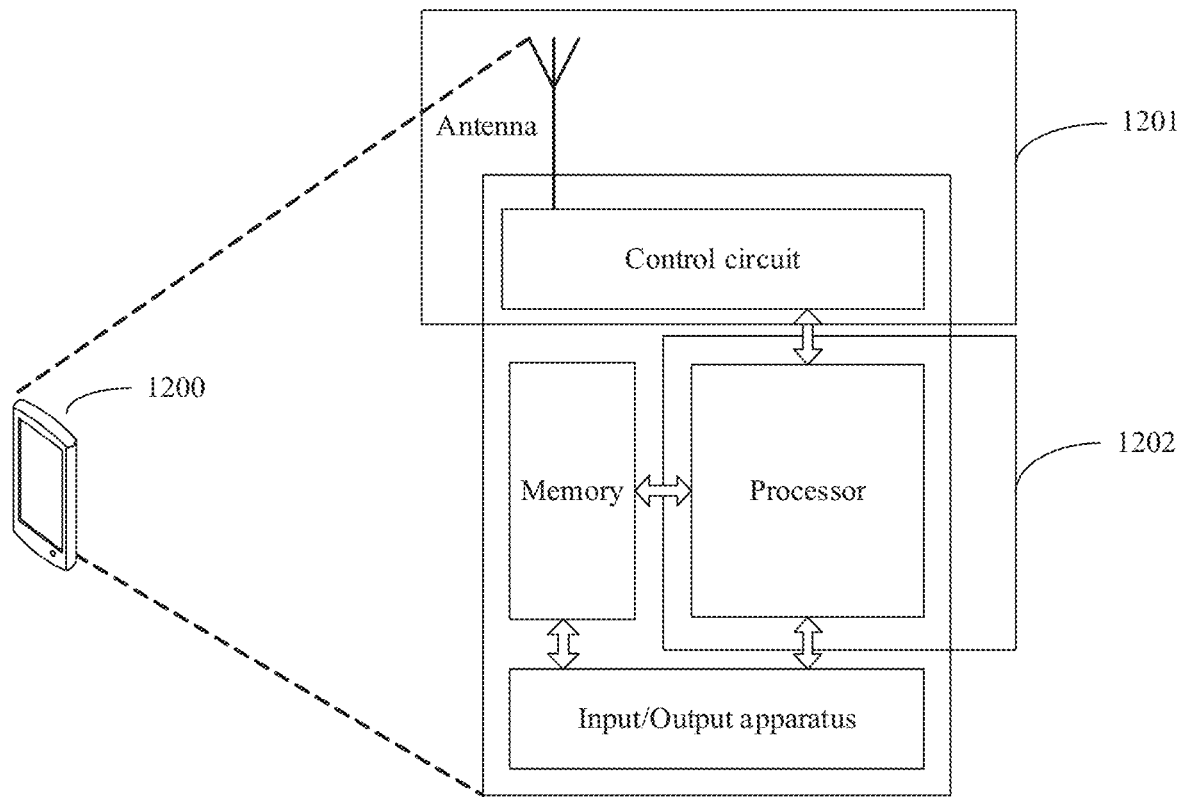
FIG. 11 is a schematic diagram of a structure of a terminal device according to an embodiment of this application.

FIG. 11 is a schematic diagram of a structure of a first wireless communications apparatus according to an embodiment of this application. The first wireless communications apparatus is applicable to the first wireless communications apparatus in the foregoing embodiments of this application. For ease of description, FIG. 11 shows only main components of the first wireless communications apparatus. As shown in FIG. 11, a first wireless communications apparatus 1200 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. A radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, a keyboard, is mainly configured to: receive data by a user and output data to the user.

After the first wireless communications apparatus is powered on, the processor may read the software program in the storage unit, explain and execute instructions of the software program, and process the data of the software program. When data needs to be sent in a wireless manner, after performing baseband processing on the to-be-sent data, the processor outputs a baseband signal to the radio frequency circuit. After performing radio frequency processing on the baseband signal, the radio frequency circuit sends a radio frequency signal in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 11 shows only one memory and one processor. An actual terminal device may include a plurality of processors and memories. The memory may also be referred to as a storage medium, a storage device, or the like. This is not limited in embodiments of this application.

In a possible implementation, the processor may include a baseband processor and a central processing unit. The baseband processor is mainly configured to process a communication protocol and communication data. The central processing unit is mainly configured to: control the entire terminal, execute a software program, and process data of the software program. The processor in FIG. 11 is integrated with functions of the baseband processor and the central processing unit. A person skilled in the art may understand that, the baseband processor and the central processing unit may be independent processors, and are interconnected by using a technology such as a bus. A person skilled in the art may understand that the first wireless communications apparatus may include a plurality of baseband processors to adapt to different network standards, the first wireless communications apparatus may include a plurality of central processing units to enhance a processing capability of the first wireless communications apparatus, and components of the first wireless communications apparatus may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program, to implement a baseband processing function.

In an example, the antenna and the control circuit that have receiving and sending functions may be considered as a transceiver module 1201 of the first wireless communications apparatus 1200, and the processor that has a processing function may be considered as a processing module 1202 of the first wireless communications apparatus 1200. As shown in FIG. 11, the first wireless communications apparatus 1200 includes the transceiver module 1201 and the processing module 1202. The transceiver module may also be referred to as a transceiver, a transceiver machine, a transceiver apparatus, or the like. In a possible implementation, a component that is in the transceiver module 1201 and that is configured to implement a receiving function may be considered as a receiving module, and a component that is in the transceiver module 1201 and that is configured to implement a sending function may be considered as a sending module. That is, the transceiver module 1201 includes the receiving module and the sending module. For example, the receiving module may also be referred to as a receiver, a receiver machine, a receiver circuit, or the like, and the sending module may be referred to as a transmitter, a transmitter machine, a transmitter circuit, or the like.

Figure 12:
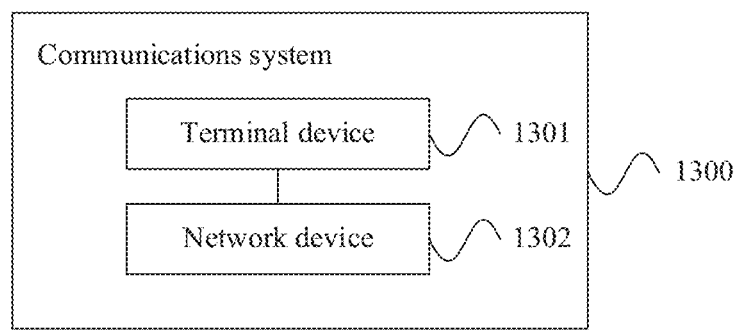
FIG. 12 is a schematic diagram of a structure of a communications system according to an embodiment of this application.

FIG. 12 is a schematic diagram of a structure of a communications system according to an embodiment of this application. As shown in FIG. 12, a communications system 1300 in this embodiment may include a first wireless communications apparatus 1301 and a network device 1302. There may be one or more first wireless communications apparatuses 1301. The first wireless communications apparatus 1301 may use a structure of the apparatus embodiment shown in FIG. 8, FIG. 10, or FIG. 11. Correspondingly, the first wireless communications apparatus 1301 may perform the technical solutions related to the first wireless communications apparatus in any one of the foregoing method embodiments. Implementation principles and technical effects thereof are similar. Details are not described herein again. The network device 1302 may use a structure of the apparatus embodiment shown in FIG. 9 or FIG. 10. Correspondingly, The network device 1302 may perform the technical solutions related to the network device in any one of the foregoing method embodiments. Implementation principles and technical effects thereof are similar. Details are not described herein again.

With reference to the foregoing descriptions, this application further provides the following embodiments.

Embodiment 1: A communications method is provided and applied to a first wireless communications apparatus. The method includes:

when the first wireless communications apparatus is in a non-connected state, receiving a system information block, where the system information block includes first information, the first information includes configuration information of a first reference signal, and the first reference signal is a reference signal that can be used when the first wireless communications apparatus is in the non-connected state; and receiving the first reference signal from a network device based on the first information.

Embodiment 2: According to the method in Embodiment 1, the configuration information includes one or more of a time location, a sending periodicity, a frequency location, a frequency density, a sequence generation parameter, and quasi co-location (Quasi-co-located. QCL) information.

Embodiment 3: According to the method in Embodiment 1 or Embodiment 2, the first information is included in at least one of a system information block 2 (system information block 2, SIB 2 for short) to a system information block y (system information block y. SIB y for short), and y≥3.

Embodiment 4: According to the method in any one of Embodiment 1 to Embodiment 3, the non-connected state includes an inactive state or an idle state.

Embodiment 5: According to the method in any one of Embodiment 1 to Embodiment 4, the receiving the first reference signal from a network device based on the first information includes: receiving the first reference signal from the network device based on the first information when the first wireless communications apparatus is in the non-connected state.

Embodiment 6: According to the method in any one of Embodiment 1 to Embodiment 5, after receiving the first information, the first wireless communications apparatus parses the first information to obtain a receiving parameter.

The receiving the first reference signal from a network device based on the first information includes:
receiving the first reference signal from the network device based on the receiving parameter.

Embodiment 7: According to the method in any one of Embodiment 1 to Embodiment 6, after the system information block is received, the method further includes:

receiving second information from the network device, where the second information indicates a status of the first reference signal.

Embodiment 8: According to the method in Embodiment 7, the receiving the first reference signal from a network device based on the first information includes:
determining that the status of the first reference signal indicated by the second information meets a condition, and receiving the first reference signal from the network device.

Embodiment 9: According to the method in Embodiment 7,
the first wireless communications apparatus performs blind detection based on the status of the first reference signal indicated by the second information.

Embodiment 10: According to the method in Embodiment 7 or Embodiment 8, after receiving the second information, the first wireless communications apparatus receives the first reference signal from the network device based on the first information.

The receiving the first reference signal from a network device based on the first information includes:
receiving the first reference signal based on the receiving parameter obtained by parsing the first information and the status of the first reference signal indicated by the second information.

Embodiment 11: According to the method in any one of Embodiment 7 to Embodiment 10, the receiving second information from the network device includes:
receiving a system information block 1 (system information block 1, SIB 1 for short) from the network device, where the SIB 1 includes the second information; or
receiving a paging message (paging message) from the network device, where the paging message includes the second information.

Embodiment 12: According to the method in Embodiment 11, the first information includes configuration information of M first reference signals, and M is an integer greater than or equal to 1.

The paging message includes the second information, the paging message is on a paging occasion (paging occasion, PO), the second information indicates statuses of N first reference signals, and N is an integer less than or equal to M.

Embodiment 13: According to the method in Embodiment 12,
N is less than M, the first information further includes information about an association between the first reference signal and the PO, and the N first reference signals are N first reference signals associated with the PO; or
N is less than M, and the N first reference signals are located before the paging occasion.

Embodiment 14: According to the method in any one of Embodiment 1 to Embodiment 13, the method further includes:

The first reference signal includes a second reference signal, the second reference signal is a reference signal that can be used by a second wireless communications apparatus, and the second wireless communications apparatus receives the second reference signal when the second wireless communications apparatus is in a connected state.

Embodiment 15: According to the method in any one of Embodiment 1 to Embodiment 13, the first reference signal is used for one or more of time synchronization, frequency synchronization, gain adjustment, channel state measurement, link quality monitoring, or radio resource management.

Embodiment 16: According to the method in any one of Embodiment 1 to Embodiment 15, the first wireless communications apparatus is a terminal device, a chip, or a chipset.

Embodiment 17: A communications method is provided and applied to a communications apparatus. The method includes:

when a first wireless communications apparatus is in a non-connected state, sending a system information block to the first wireless communications apparatus, where the system information block includes first information, the first information includes configuration information of a first reference signal, and the first reference signal is a reference signal that can be used when the first wireless communications apparatus is in the non-connected state; and sending the first reference signal to the first wireless communications apparatus based on the configuration information.

Embodiment 18: According to the method in Embodiment 17, the configuration information includes one or more of a time location, a sending periodicity, a frequency location, a frequency density, a sequence generation parameter, and quasi co-location (Quasi-co-located, QCL) information.

Embodiment 19: According to the method in Embodiment 17, the first information is included in at least one of a system information block 2 (system information block 2. SIB 2 for short) to a system information block y (system information block y, SIB y for short), and y≥3.

Embodiment 20: According to the method in Embodiment 17, the non-connected state includes an inactive state or an idle state.

Embodiment 21: According to the method in Embodiment 17, when the first wireless communications apparatus is in the non-connected state, a network device sends the first reference signal to the first wireless communications apparatus.

Embodiment 22: According to the method in any one of Embodiment 17 to Embodiment 21, after the system information block is sent to the first wireless communications apparatus, the method further includes:

sending second information to the first wireless communications apparatus, where the second information indicates a status of the first reference signal.

Embodiment 23: According to the method in Embodiment 22, the sending second information to the first wireless communications apparatus includes:

sending a system information block 1 (system information block 1, SIB 1 for short) to the first wireless communications apparatus, where the SIB 1 includes the second information; or sending a paging message (paging message) to the first wireless communications apparatus, where the paging message includes the second information.

Embodiment 24: According to the method in Embodiment 23, the first information includes configuration information of M first reference signals, and M is an integer greater than or equal to 1.

The paging message includes the second information, the paging message is on a paging occasion (paging occasion, PO), the second information indicates statuses of N first reference signals, and N is an integer less than or equal to M.

Embodiment 25: According to the method in Embodiment 24, when N is less than M, the first information further includes information about an association between the first reference signal and the PO, and the N first reference signals are N first reference signals associated with the PO: or when N is less than M, the N first reference signals are located before the paging occasion.

Embodiment 26: According to the method in any one of Embodiment 17 to Embodiment 25, the method further includes:

When a second wireless communications apparatus is in a connected state, the network device sends third information to the second wireless communications apparatus. The third information includes configuration information of a second reference signal, and the second reference signal is a reference signal that can be used when the second wireless communications apparatus is in the connected state.

The second reference signal is a subset of the first reference signal.

Embodiment 27: According to the method in any one of Embodiment 17 to Embodiment 25, the first reference signal is used for one or more of time synchronization, frequency synchronization, gain adjustment, channel state measurement, link quality monitoring, or radio resource management.

Embodiment 28: A communications method is provided and includes:

When a second wireless communications apparatus is in a connected state, a network device sends third information, and the second wireless communications apparatus receives the third information. The third information includes configuration information of a second reference signal, and the second reference signal is a reference signal that can be used when the second wireless communications apparatus is in the connected state.

When a first wireless communications apparatus is in a non-connected state, the network device sends a system information block, and the first wireless communications apparatus receives the system information block. The system information block includes first information, the first information includes configuration information of a first reference signal, and the first reference signal is a reference signal that can be used when the first wireless communications apparatus is in the non-connected state. The second reference signal is a subset of the first reference signal.

The first wireless communications apparatus parses the first information to obtain a receiving parameter.

When the first wireless communications apparatus is in the non-connected state, the network device sends second information, and the first wireless communications apparatus receives the second information. The second information indicates a status of the first reference signal.

The first wireless communications apparatus determines that the status of the first reference signal indicated by the second information meets a condition, and receives the first reference signal from the network device based on the receiving parameter. The first reference signal is located before a paging occasion (paging occasion. PO).

The first wireless communications apparatus determines that the status of the first reference signal indicated by the second information does not meet the condition, and receives a synchronization signal block (synchronization signal block, SSB for short).

The first wireless communications apparatus performs at least one of AGC adjustment, time synchronization, and frequency synchronization by using the first reference signal or the SSB.

When the first wireless communications apparatus is in the non-connected state, the network device sends paging, and the first wireless communications apparatus receives the paging on the PO.

Embodiment 29: According to the method in Embodiment 28, the configuration information includes one or more of a time location, a sending periodicity, a frequency location, a frequency density, a sequence generation parameter, and quasi co-location (Quasi-co-located, QCL) information.

Embodiment 30: According to the method in Embodiment 28, the first information is included in at least one of a system information block 2 (system information block 2. SIB 2 for short) to a system information block y (system information block y, SIB y for short), and y≥3.

Embodiment 31: According to the method in Embodiment 28, the non-connected state includes an inactive state or an idle state.

Embodiment 32: According to the method in Embodiment 28, the first wireless communications apparatus receives the first reference signal or the SSB in the non-connected state.

Embodiment 33: According to the method in any one of Embodiment 28 to Embodiment 32, that the network device sends second information includes:

The network device sends a system information block 1 (system information block 1, SIB 1 for short), where the SIB 1 includes the second information.

Alternatively, the network device sends a paging message (paging message), where the paging message includes the second information.

Embodiment 34: According to the method in Embodiment 33, the first information includes configuration information of M first reference signals, and M is an integer greater than or equal to 1.

The paging message includes the second information, the paging message is on a paging occasion (paging occasion, PO), the second information indicates statuses of N first reference signals, and N is an integer less than or equal to M.

Embodiment 35: According to the method in Embodiment 34, N is less than M, the first information further includes information about an association between the first reference signal and the PO, and the N first reference signals are N first reference signals associated with the PO: or N is less than M, and the N first reference signals are located before the paging occasion.

Embodiment 36: According to the method in any one of Embodiment 28 to Embodiment 35, the first wireless communications apparatus performs blind detection based on the status of the first reference signal indicated by the second information.

Embodiment 37: According to the method in any one of Embodiment 28 to Embodiment 36, the first reference signal is used for one or more of time synchronization, frequency synchronization, gain adjustment, channel state measurement, link quality monitoring, or radio resource management.

Embodiment 38: A wireless communications apparatus is provided and includes;
a receiving module, configured to: when the wireless communications apparatus is in a non-connected state, receive a system information block, where the system information block includes first information, the first information includes configuration information of a first reference signal, and the first reference signal is a reference signal that can be used when the wireless communications apparatus is in the non-connected state; and receive the first reference signal from a network device based on the first information.

Embodiment 39: According to the apparatus in Embodiment 38, the configuration information includes one or more of a time location, a sending periodicity, a frequency location, a frequency density, a sequence generation parameter, and quasi co-location (Quasi-co-located, QCL) information.

Embodiment 40: According to the apparatus in Embodiment 38 or Embodiment 39, the first information is included in at least one of a system information block 2 (system information block 2, SIB 2 for short) to a system information block y (system information block y; SIB y for short), and y≥3.

Embodiment 40: According to the apparatus in Embodiment 38 or Embodiment 39, the non-connected state includes an inactive state or an idle state.

Embodiment 41: According to the apparatus in Embodiment 38 or Embodiment 39, the receiving module receives the first reference signal when the first wireless communications apparatus is in the non-connected state.

Embodiment 42: According to the apparatus in any one of Embodiment 38 to Embodiment 41, the first wireless communications apparatus further includes a processing module.

After the receiving module receives the first information, the processing module parses the first information to obtain a receiving parameter.

The receiving the first reference signal from a network device based on the first information includes:
receiving the first reference signal from the network device based on the receiving parameter.

Embodiment 43: According to the apparatus in any one of Embodiment 38 to Embodiment 42, the receiving module is further configured to receive second information from the network device, where the second information indicates a status of the first reference signal.

Embodiment 44: According to the apparatus in Embodiment 43, the apparatus further includes:

The processing module is configured to: determine that the status of the first reference signal indicated by the second information meets a condition, and receive the first reference signal from the network device.

Embodiment 45: According to the apparatus in Embodiment 43, the apparatus further includes:

The processing module is configured to control the wireless communications apparatus to perform blind detection based on the status of the first reference signal indicated by the second information.

Embodiment 46: According to the apparatus in Embodiment 43, after receiving the second information, the receive module receives the first reference signal from the network device based on the first information.

The receiving the first reference signal from a network device based on the first information includes:

The receiving module receives the first reference signal based on the receiving parameter obtained by parsing the first information and the status of the first reference signal indicated by the second information.

Embodiment 47: According to the apparatus in Embodiment 43, the receiving module is specifically configured to: receive a system information block 1 (system information block 1, SIB 1 for short) from the network device, where the SIB 1 includes the second information: or receive a paging message (paging message) from the network device, where the paging message includes the second information.

Embodiment 48: According to the apparatus in Embodiment 47, the first information includes configuration information of M first reference signals, and M is an integer greater than or equal to 1.

The paging message includes the second information, the paging message is on a paging occasion (paging occasion, PO), the second information indicates statuses of N first reference signals, and N is an integer less than or equal to M.

Embodiment 49: According to the apparatus in Embodiment 48, N is less than M, the first information further includes information about an association between the first reference signal and the PO, and the N first reference signals are N first reference signals associated with the PO: or N is less than M. and the N first reference signals are located before the paging occasion.

Embodiment 50: According to the apparatus in any one of Embodiment 38 to Embodiment 49, the first reference signal includes a second reference signal, the second reference signal is a reference signal that can be used by a second wireless communications apparatus, and the second wireless communications apparatus receives the second reference signal when the second wireless communications apparatus is in a connected state.

Embodiment 51: According to the apparatus in any one of Embodiment 38 to Embodiment 49, the first reference signal is used for one or more of time synchronization, frequency synchronization, gain adjustment, channel state measurement, link quality monitoring, or radio resource management.

Embodiment 52: A communications apparatus is provided and includes:
 a sending module, configured to: when a first wireless communications apparatus is in a non-connected state, send a system information block to the first wireless communications apparatus, where the system information block includes first information, the first information includes configuration information of a first reference signal, and the first reference signal is a reference signal that can be used when the first wireless communications apparatus is in the non-connected state; and send the first reference signal to the first wireless communications apparatus based on the configuration information.

Embodiment 53: According to the apparatus in Embodiment 52, the configuration information includes one or more of a time location, a sending periodicity, a frequency location, a frequency density, a sequence generation parameter, and quasi co-location (Quasi-co-located, QCL) information.

Embodiment 54: According to the apparatus in Embodiment 52, the first information is included in at least one of a system information block 2 (system information block 2. SIB 2 for short) to a system information block y (system information block y, SIB y for short), and y≥3.

Embodiment 55: According to the apparatus in Embodiment 52, the non-connected state includes an inactive state or an idle state.

Embodiment 56: According to the apparatus in Embodiment 52, the first wireless communications apparatus receives the first reference signal in the non-connected state.

Embodiment 57: According to the apparatus in any one of Embodiment 52 to Embodiment 56,
 the sending module is further configured to send second information to the first wireless communications apparatus, where the second information indicates a status of the first reference signal.

Embodiment 58: According to the apparatus in Embodiment 57,
 the sending module is configured to: send a system information block 1 (system information block 1, SIB 1 for short) to the first wireless communications apparatus, where the SIB 1 includes the second information; or send a paging message (paging message) to the first wireless communications apparatus, where the paging message includes the second information.

Embodiment 59: According to the apparatus in Embodiment 58, the first information includes configuration information of M first reference signals, and M is an integer greater than or equal to 1.

The paging message includes the second information, the paging message is on a paging occasion (paging occasion, PO), the second information indicates statuses of N first reference signals, and N is an integer less than or equal to M.

Embodiment 60: According to the apparatus in Embodiment 59,
 N is less than M, the first information further includes information about an association between the first reference signal and the PO, and the N first reference signals are N first reference signals associated with the PO; or
 N is less than M, and the N first reference signals are located before the paging occasion.

Embodiment 61: According to the apparatus in any one of Embodiment 52 to Embodiment 60, the sending module is further configured to send a second reference signal, where the first reference signal includes the second reference signal, the second reference signal is a reference signal that can be used by a second wireless communications apparatus, and the second wireless communications apparatus receives the second reference signal when the second wireless communications apparatus is in a connected state.

Embodiment 62: According to the apparatus in any one of Embodiment 52 to Embodiment 60, the first reference signal is used for one or more of time synchronization, frequency synchronization, gain adjustment, channel state measurement, link quality monitoring, or radio resource management.

Embodiment 63: A communications system is provided and includes: a terminal device configured to implement the method according to any one of Embodiment 1 to Embodiment 15, and a network device configured to implement the method according to any one of claims 17 to 27.

Embodiment 64: A communications apparatus is provided and includes a memory and a processor. The memory is coupled to the processor.

The memory is configured to store program instructions.

The processor is configured to invoke the program instructions in the memory to perform the communications method according to any one of Embodiment 1 to Embodiment 15 or the communications method according to any one of Embodiment 17 to Embodiment 27.

Embodiment 65: A readable storage medium is provided. The readable storage medium stores a computer program, and when the computer program is executed, the communications method according to any one of Embodiment 1 to Embodiment 15 or the communications method according to any one of Embodiment 17 to Embodiment 27 is implemented.

It should be noted that division into the modules in the embodiments is an example, and is merely logical function division. In an actual implementation, another division manner may be used. Function modules in embodiments of this application may be integrated into one processing module, or each of the modules may exist alone physically, or two or more modules are integrated into one module. The integrated module may be implemented in a form of hardware, or may be implemented in a form of a software function module.

When the integrated module is implemented in the form of a software function module and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor (processor) to perform all or some of the steps of the methods in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The available medium may be a magnetic medium (for example, a floppy disk, a hard disk, or a magnetic tape), an optical medium (for example, a DVD), a semiconductor medium (for example, a solid state disk, Solid State Disk (SSD)), or the like.

What is claimed is:

1. A communications method implemented by a first wireless communications apparatus, wherein the communications method comprises:
    receiving a system information block when the first wireless communications apparatus is in a non-connected state, wherein the system information block comprises first information, and wherein the first information comprises first configuration information of a first reference signal that is used when the first wireless communications apparatus is in the non-connected state;
    receiving, from a network device based on the first information, the first reference signal;
    receiving, after receiving the system information block, from the network device, second information indicating a first status of the first reference signal; and
    receiving, from the network device, a system information block 1 (SIB 1) comprising the second information, or a paging message comprising the second information,
    wherein the first information comprises second configuration information of M first reference signals, wherein M is an integer greater than or equal to 1, wherein the paging message is comprised in a paging occasion (PO), wherein the second information indicates second statuses of N first reference signals, and wherein N is an integer less than or equal to M.

2. The communications method of claim 1, wherein the first configuration information comprises one or more of a time location, a sending periodicity, a frequency location, a frequency density, a sequence generation parameter, or quasi co-location (QCL) information.

3. The communications method of claim 1, wherein the first information is comprised in at least one of a system information block 2 (SIB 2) to a system information block y (SIB y), and wherein y≥3.

4. The communications method of claim 1, wherein the non-connected state comprises an inactive state or an idle state.

5. The communications method of claim 1, further comprising receiving, from the network device based on the first information, the first reference signal when the first wireless communications apparatus is in the non-connected state.

6. The communications method of claim 1, wherein after receiving the system information block, the communications method further comprises:
    parsing the first information to obtain a receiving parameter; and
    further receiving, from the network device based on the receiving parameter, the first reference signal.

7. The communications method of claim 1, further comprising
    receiving the first reference signal from the network device when the first status meets a condition.

8. The communications method of claim 1, further comprising performing, based on the first status, blind detection.

9. The communications method of claim 1, wherein after receiving the second information, the communications method further comprises:
    parsing the first information to obtain a receiving parameter; and
    further receiving, based on the receiving parameter and the first status, the first reference signal.

10. The communications method of claim 1, wherein N is less than M, and wherein either:
    the first information further comprises third information about an association between the first reference signal and the PO, wherein the N first reference signals are associated with the PO; or
    the N first reference signals are located before the PO.

11. The communications method of claim 1, wherein the first reference signal comprises a second reference signal for a second wireless communications apparatus when the second wireless communications apparatus is in a connected state.

12. The communications method of claim 1, wherein the first reference signal is used for one or more of time synchronization, frequency synchronization, gain adjustment, channel state measurement, link quality monitoring, or radio resource management.

13. The communications method of claim 1, wherein the first wireless communications apparatus is a terminal device, a chip, or a chipset.

14. A communications method implemented by a second communications apparatus, wherein the communications method comprises:

sending, to a first wireless communications apparatus, a system information block when the first wireless communications apparatus is in a non-connected state, wherein the system information block comprises first information, and wherein the first information comprises configuration information of a first reference signal for use when the first wireless communications apparatus is in the non-connected state; and sending, to the first wireless communications apparatus based on the configuration information, the first reference signal;

sending, after sending the system information block, second information indicating a first status of the first reference signal; and sending, a system information block 1 (SIB 1) comprising the second information, or a paging message comprising the second information, wherein the first information comprises second configuration information of M first reference signals, wherein M is an integer greater than or equal to 1, wherein the paging message is comprised in a paging occasion (PO), wherein the second information indicates second statuses of N first reference signals, and wherein N is an integer less than or equal to M.

15. The communications method of claim 14, wherein the first information is comprised in at least one of a system information block 2 (SIB 2) to a system information block y (SIB y), and wherein y≥3.

16. The communications method of claim 14, wherein after sending the system information block, the communications method further comprises sending, to the first wireless communications apparatus, second information indicating a status of the first reference signal.

17. A communications method comprising:
when a second wireless communications apparatus is in a connected state:
  sending, by a network device, third information, wherein the third information comprises configuration information of a second reference signal for use when the second wireless communications apparatus is in the connected state; and
  receiving, by the second wireless communications apparatus, the third information;
when a first wireless communications apparatus is in a non-connected state:
  sending, by the network device, a system information block;
  receiving, by the first wireless communications apparatus, the system information block, wherein the system information block comprises first information, wherein the first information comprises configuration information of a first reference signal for use when the first wireless communications apparatus is in the non-connected state, and wherein the second reference signal is a subset of the first reference signal;
  parsing, by the first wireless communications apparatus, the first information to obtain a receiving parameter;
  sending, by the network device, second information;
  receiving, by the first wireless communications apparatus after receiving the system information block, the second information indicating a status of the first reference signal;
  receiving, when the status meets a condition, from the network device, and based on the receiving parameter, the first reference signal before a paging occasion (PO);
  receiving, when the status does not meet the condition, a synchronization signal block (SSB);
  performing, by the first wireless communications apparatus using the first reference signal or the SSB, at least one of automatic gain control (AGC) adjustment, time synchronization, or frequency synchronization;
  sending, by the network device, paging; and
  receiving, by the first wireless communications apparatus, the paging in the PO; and
  receiving, by the first wireless communications apparatus from the network device, a system information block 1 (SIB 1) comprising the second information, or a paging message comprising the second information;
wherein the first information comprises second configuration information of M first reference signals, wherein M is an integer greater than or equal to 1, wherein the paging message is comprised in a paging occasion (PO), wherein the second information indicates second statuses of N first reference signals, and wherein N is an integer less than or equal to M.

* * * * *